United States Patent
Nah et al.

(10) Patent No.: US 10,936,904 B2
(45) Date of Patent: Mar. 2, 2021

(54) METHOD AND APPARATUS FOR RECOGNIZING HANDWRITTEN CHARACTERS USING FEDERATED LEARNING

(71) Applicant: LG ELECTRONICS INC., Seoul (KR)

(72) Inventors: Heeyeon Nah, Seoul (KR); Daesung Kim, Seoul (KR); Jaewoong Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/565,154

(22) Filed: Sep. 9, 2019

(65) Prior Publication Data
US 2020/0005081 A1 Jan. 2, 2020

(30) Foreign Application Priority Data
Jul. 31, 2019 (KR) .................. 10-2019-0093501

(51) Int. Cl.
*G06F 17/18* (2006.01)
*G06F 21/60* (2013.01)
(Continued)

(52) U.S. Cl.
CPC ....... *G06K 9/6254* (2013.01); *G06F 3/04883* (2013.01); *G06K 9/00409* (2013.01); *G06K 9/033* (2013.01)

(58) Field of Classification Search
CPC .............. G06F 3/0237; G06F 3/04883; G06F 3/04886; G06F 8/35; G06F 17/18; G06F 21/60; G06F 21/6245; G06K 9/00; G06K 9/033; G06K 9/00409; G06K 9/46; G06K 9/62; G06K 9/6254; G06K 9/6259; G06K 2209/01; G06N 3/0445; G06N 3/0454;
(Continued)

(56) References Cited

U.S. PATENT DOCUMENTS 10,521,654 B2 * 12/2019 Madhani .............. G06K 9/6202
10,666,342 B1 * 5/2020 Landis ..................... G06N 3/08
(Continued)

*Primary Examiner* — Michael J Eurice
(74) *Attorney, Agent, or Firm* — Lee, Hong, Degerman, Kang & Waimey

(57) ABSTRACT

Provided is a method for recognizing handwritten characters in a terminal through federated learning. In the method, a first common prediction model for recognizing text from handwritten characters input from a user is applied, the handwritten characters are received from the user, feature values are extracted from an image including the handwritten characters, the feature values are input to the first common prediction mode, first text information is determined from an output of the first common prediction model, the first text information and a second text information received from the user for error correction of the first text information are cached, and the first common prediction model is learned using the image including the handwritten characters, the first text information, and the second text information. In this way, the terminal can determine the text from the handwritten characters input by the user, and can learn the first common prediction model through a feedback operation of the user.

12 Claims, 11 Drawing Sheets

(51) Int. Cl.
*G06K 9/62* (2006.01)
*G06K 9/03* (2006.01)
*G06K 9/00* (2006.01)
*G06F 3/0488* (2013.01)

(58) Field of Classification Search
CPC .......... G06N 3/08; G06N 3/084; G06N 3/088; G06N 5/025; G06N 5/043; G06N 7/005; G06N 20/00; H04L 67/2842; H04L 67/34
See application file for complete search history.

(56) References Cited

U.S. PATENT DOCUMENTS

| | | | |
|---|---|---|---|
| 2005/0125369 A1* | 6/2005 | Buck | G06K 9/00986 706/12 |
| 2005/0163347 A1* | 7/2005 | Aparicio, IV | G06K 9/6211 382/103 |
| 2005/0228783 A1* | 10/2005 | Shanahan | G06K 9/6269 |
| 2014/0088989 A1* | 3/2014 | Krishnapuram | G06F 19/00 705/2 |
| 2014/0108004 A1* | 4/2014 | Sternby | G06F 40/171 704/9 |
| 2015/0079576 A1* | 3/2015 | Obae | G06Q 50/20 434/350 |
| 2015/0106306 A1* | 4/2015 | Birdwell | G06N 3/10 706/11 |
| 2017/0011262 A1* | 1/2017 | Onis | G06K 9/00416 |
| 2017/0116498 A1* | 4/2017 | Raveane | G06N 3/10 |
| 2017/0153806 A1* | 6/2017 | Rucine | G06F 3/017 |
| 2017/0161866 A1* | 6/2017 | Baudry | G06T 3/0075 |
| 2017/0364744 A1* | 12/2017 | Savchenkov | G06T 7/13 |
| 2018/0165554 A1* | 6/2018 | Zhang | G06K 9/6256 |
| 2018/0218257 A1* | 8/2018 | Xu | G06F 9/4806 |
| 2018/0247194 A1* | 8/2018 | Plebani | G06N 3/08 |
| 2018/0276560 A1* | 9/2018 | Hu | G06N 20/00 |
| 2018/0314975 A1* | 11/2018 | Zang | G06N 20/00 |
| 2019/0042937 A1* | 2/2019 | Sheller | G06F 21/554 |
| 2019/0050746 A1* | 2/2019 | Sanketi | G06N 5/048 |
| 2019/0114302 A1* | 4/2019 | Bequet | G06N 3/0445 |
| 2019/0213346 A1* | 7/2019 | Friedman | G06F 21/604 |
| 2019/0227980 A1* | 7/2019 | McMahan | G06N 3/0454 |
| 2019/0258807 A1* | 8/2019 | DiMaggio | G06N 20/00 |
| 2019/0294999 A1* | 9/2019 | Guttmann | G06K 9/6219 |
| 2019/0303662 A1* | 10/2019 | Madhani | G06K 9/6202 |
| 2020/0082056 A1* | 3/2020 | Hasegawa | G06K 9/6264 |
| 2020/0120023 A1* | 4/2020 | Munson | H04L 65/4084 |
| 2020/0125956 A1* | 4/2020 | Ravi | G06K 9/6256 |
| 2020/0134424 A1* | 4/2020 | Chen | G06N 3/08 |
| 2020/0151611 A1* | 5/2020 | McGavran | G06N 20/00 |
| 2020/0167834 A1* | 5/2020 | Matsuoka | G06N 3/08 |
| 2020/0202243 A1* | 6/2020 | Guttmann | G06N 5/043 |

* cited by examiner

- DL/UL ACK/NACK
- UE CQI/PMI RI REPORT USING PUSCH AND PUCCH

SCREEN AFTER INFERENCE OF HANDWRITTEN CHARACTER —S1210

USER FEEDBACK —S1220

MESSAGE TRANSMISSION —S1230

METHOD AND APPARATUS FOR RECOGNIZING HANDWRITTEN CHARACTERS USING FEDERATED LEARNING

CROSS-REFERENCE TO RELATED APPLICATION

Pursuant to 35 U.S.C. § 119(a), this application claims the benefit of earlier filing date and right of priority to Korean Patent Application No. 10-2019-0093501, filed on Jul. 31, 2019, the contents of which are hereby incorporated by reference herein in its entirety.

BACKGROUND OF THE INVENTION

Field of the Invention

The present disclosure relates to a method and an apparatus for recognizing handwritten characters in a terminal using a federated learning.

Related Art

Optical character recognition (OCR) is to acquire images of characters, which are written by humans or printed by machines, with an image scanner and convert the acquired images into machine-readable characters. Software converting textual images of documents that can be acquired by the image scanning into formats such as a character code that can be edited by a computer is commonly called OCR. The OCR has began as a field of research into artificial intelligence or machine vision.

The existing technology of recognizing handwritten characters using OCR was based on a method for acquiring a large amount of handwritten character data from a server and learning a handwritten character recognition model included in a server using the acquired handwritten character data. However, since the existing technology transmits individual raw data to the server, there is a problem in that personal information may be leaked and it is difficult to collect a large amount of handwritten character data.

SUMMARY OF THE INVENTION

The present disclosure aims to address the above-described needs and/or problems.

The present disclosure provides a method for recognizing handwritten characters in a terminal.

In addition, the present disclosure provides a learning method for collecting learning data by receiving a feedback operation for error correction from users of each terminal and using the collected learning data in each terminal.

Objects of the present disclosure are not limited to the above-mentioned objects. That is, other objects that are not mentioned may be obviously understood by those skilled in the art to which the present disclosure pertains from the following detailed description.

In an aspect, a method for recognizing handwritten characters in a terminal through federated learning includes: receiving the handwritten characters from a user; extracting a feature value from an image including the handwritten characters; inputting the feature value to a first common prediction model and determining first text information from an output of the first common prediction model; caching the first text information and second text information received from the user for error correction of the first text information; and learning the first common prediction model using the image including the handwritten characters, the first text information, and the second text information, in which the first common prediction model may be received through a server, and the first text information may indicate text that may be mapped by the image.

In the learning of the first common prediction model, a weight parameter of the first common prediction model may be updated using a hyper parameter received from the server.

The method may further include: deleting the first text information and the second text information; transmitting the weight parameter to the server; and applying a second common prediction model received from the server, in which the second common prediction model may learn the first common prediction model using the weight parameter received from one or more terminals in the server.

In the receiving of the handwritten characters from the user, the handwritten characters may be received by a touch operation using a finger or a touch pen on an input region of the terminal.

The second text information may include correct answer text input by the user through an input region of the terminal based on the first text information recognized by the user through an output screen of the terminal.

In the applying of the second common prediction model, the first common prediction model may be learned using the weight parameter extracted from the second common prediction model.

The method may further include: transmitting the second text information to another terminal.

The learning of the first common prediction model may be performed when a condition set in the terminal is satisfied, and the condition may include a state where the terminal is being charged, a state in which the terminal is connected to WiFi, and a state where the terminal is in an idle mode.

The applying of the second common prediction model may be performed when the condition set in the terminal is satisfied, and the condition may include a state in which a permission is input from the user as a response to an update notification message output to a screen of the terminal, a state where the terminal is being charged, a state where the terminal is connected to WiFi, or a state where the terminal is in an idle mode.

The second common prediction model may learn the first common prediction model when a specific number or more of weight parameters set in the server are received.

In another aspect, a method for recognizing handwritten characters in a server through federated learning includes: transmitting, by a terminal, a first common prediction model for recognizing text from the handwritten characters received from a user; transmitting, by the terminal, a hyperparameter for learning the first common prediction model; receiving a weight parameter from the terminal; and learning the first common prediction model using the weight parameter, in which the first common prediction model may be transmitted to one or more terminals.

The method may further include: transmitting a second common prediction model to the terminal, in which the second common prediction model may learn the first common prediction model using the weight parameter.

The learning of the first common prediction model may be performed when a set specific number or more of the weight parameters are received.

In the transmitting of the second common prediction model to the terminal, the weight parameter extracted from the second common prediction model may be transmitted.

The transmitting of the second common prediction model to the terminal may be performed when a condition set in the terminal is satisfied, and the condition may include a state where the terminal is being charged, a state in which the terminal is connected to WiFi, and a state where the terminal is in an idle mode.

In still another aspect, a terminal performing a method for recognizing handwritten characters through federated learning includes: a communication module; a memory; a display unit; and a processor, in which the processor receives the handwritten characters from a user through the display unit, extracts a feature value from an image including the handwritten characters, inputs the feature value to a first common prediction model and determining first text information from an output of the first common prediction model, caches the first text information and second text information received from the user for error correction of the first text information through the memory, and learns the first common prediction model using the image including the handwritten characters, the first text information, and the second text information, and the first common prediction model is received through a server, and the first text information indicates text that is mapped by the image.

Figure 1:
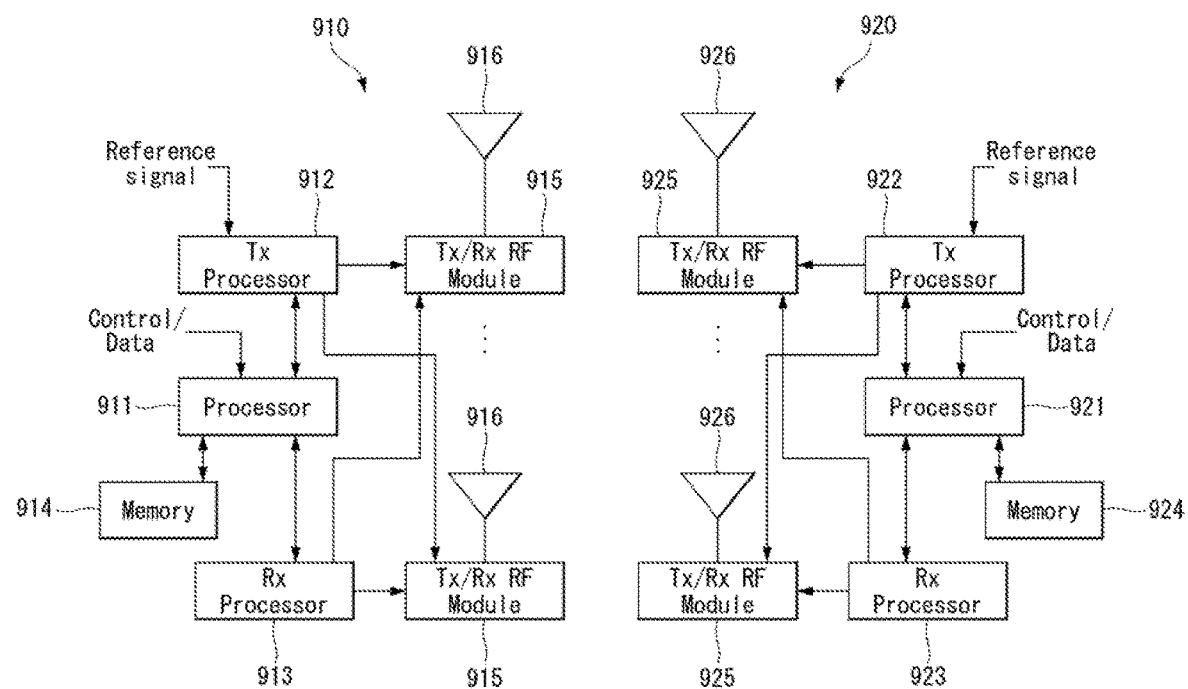
FIG. 1 is a block configuration diagram of a wireless communication system to which methods proposed herein can be applied.

The accompanying drawings, which are included as part of the detailed description to assist understanding of the invention, illustrate embodiments of the invention and explain the technical features of the invention together with the detailed description.

DESCRIPTION OF EXEMPLARY EMBODIMENTS

Hereinafter, exemplary embodiments disclosed herein will be described with reference to attached drawings, in which identical or like components are given like reference numerals regardless of reference symbols, and repeated description thereof will be omitted. Suffixes for components, "module" and "unit" used in the following description, will be given or used in place of each other taking only easiness of specification preparation into consideration, and they do not have distinguishable meanings or roles by themselves. Additionally, it is noted that the detailed description for related prior arts may be omitted herein so as not to obscure essential points of the disclosure. Further, the attached drawings are intended to facilitate the understanding of examples disclosed herein, and the technical spirit disclosed herein is not limited by the attached drawings, and rather should be construed as including all the modifications, equivalents and substitutes within the spirit and technical scope of the invention.

The terms including ordinal number such as, first, second and the like may be used to explain various components, but the components are not limited by the terms. Said terms are used in order only to distinguish one component from another component.

Further, when one element is referred to as being "connected" or "accessed" to another element, it may be directly connected or accessed to the other element or intervening elements may also be present as would be understood by one of skill in the art. On the contrary, when one element is referred to as being "directly connected" or "directly accessed" to another element, it should be understood as that the other element is not present between them.

Singular expression includes plural expression unless explicitly stated to the contrary in the context.

Herein, it should be understood that the terms "comprise," "have," "contain," "include," and the like are intended to specify the presence of stated features, numbers, steps, actions, components, parts or combinations thereof, but they do not preclude the presence or addition of one or more other features, numbers, steps, actions, components, parts or combinations thereof.

Hereinafter, autonomous driving apparatus requiring AI processed information, and/or 5th generation mobile communication which an AI processor requires will be described through sections A to G.

A. Example of UE and Network Block Diagram

FIG. 1 exemplifies a block diagram of a wireless communication system to which methods proposed herein may be applied.

Referring to FIG. 1, an apparatus (AI apparatus) including an AI module may be defined as a first communication apparatus (910 in FIG. 1), and a processor 911 may perform an AI specific action.

5G network including another apparatus (AI server) communicating with the AI apparatus may be as a second communication apparatus (920 in FIG. 1), and a processor 921 may perform an AI specific action.

The 5G network may be denoted as the first communication apparatus, and the AI apparatus may be denoted as the second communication apparatus.

For example, the first communication apparatus or the second communication apparatus may be a base station, a network node, a transmission terminal, a wireless apparatus, a wireless communication apparatus, a vehicle, a vehicle loaded with a autonomous driving function, a connected car, a drone (unmanned aerial vehicle, UAV), an artificial intelligence (AI) module, a robot, an augmented reality (AR) apparatus, a virtual reality (VR) apparatus, a mix reality apparatus, a hologram apparatus, a public safety apparatus, an MTC apparatus, an IoT apparatus, a medical apparatus, a fintech apparatus (or financial apparatus), a security apparatus, a climate/environmental apparatus, 5G service related apparatus or 4th industrial revolution field related apparatus.

For example, the terminal or user equipment (UE) may include a mobile phone, a smart phone, a laptop computer, a digital broadcasting terminal, a personal digital assistant (PDA), a portable multimedia player (PMP), a navigation, a slate PC, a tablet PC, a wearable devices, e.g., a smartwatch, a smartglass, a head mounted display (HMD), or the like. For example, the HMD may be a display apparatus which is worn an the head. For example, the HMD may be used to embody VR, AR or MR. For example, the drone may be a flying object which is flown by wireless control signals without a human on board. For example, the VR apparatus may include an apparatus for embodying an object or background of a virtual world. For example, the AR apparatus may include an apparatus which embodies by connecting an object or background of a virtual world to an object or background of a real world. For example, the MR apparatus may include an apparatus which embodies by fusing an object or background of a virtual world to an object or background of a real world. For example, the hologram apparatus may include an apparatus which embodies a hologram, i.e., 360 degree three-dimensional image, by recording and replaying three-dimensional information, utilizing Interference phenomenon of light produced when two laser lights meet. For example, the public safety apparatus may include an image relay apparatus or an imaging apparatus which is wearable onto the body of a user. For example, the MTC apparatus and the IoT apparatus may be an apparatus which does not require direct intervention or operation of a human. For example, the MTC apparatus and the IoT apparatus may include smart meters, bending machines, thermometers, smart light bulbs, door locks, various sensors or the like. For example, the medical apparatus may be an apparatus used to diagnose, cure, mitigate, treat, or prevent diseases. For example, the medical apparatus may be an apparatus used to diagnose, cure, mitigate or correct injuries or disabilities. For example, the medical apparatus may be an apparatus used for the purpose of inspecting, replacing, or transforming a structure or function. For example, the medical apparatus may be an apparatus used for the purpose of controlling pregnancy. For example, the medical apparatus may include medical devices, surgical devices, (in vitro) diagnostic devices, hearing aids, medical procedure devices or the like. For example, the security device may be a device installed to prevent danger that may occur and to maintain safety. For example, the security device may be cameras, CCTVs, recorders, black boxes or the like. For example, the fintech apparatus may be devices that can provide financial services such as mobile payments or the like.

Referring to FIG. 1, the first communication apparatus 910 and the second communication apparatus 920 include processors 911,921, memories 914,924, Tx/Rx radio frequency (RF) modules 915,925, Tx processors 912,922, Rx processors 913,923, antennas 916,926. The Tx/Rx module may be referred to as a transceiver. Each of Tx/Rx modules 915 transmits signals toward each of antennas 926. The processor embodies the function, the process and/or the method described above. The processor 921 may be associated with a memory (924) which store program code and data. The memory may be referred to as a computer readable medium. More specifically, in DL (communication from the first communication apparatus to the second communication apparatus), the transmission TX processor 912 embodies various signal processing functions for a L1 layer (i.e., physical layer). The RX processor embodies various signal processing functions of the L1 (i.e., physical layer).

UL (communication from the second communication apparatus to the first communication apparatus) is processed in the first communication apparatus 910 in a similar way as described in connection with the receiving function in the second communication apparatus 920. Each of the Tx/Rx modules 925 receives signals via each of the antennas 926. Each of the Tx/Rx modules provides RF carrier and information to the Rx processor 923. The processor 921 may be associated with a memory (924) which store program code and data. The memory may be referred to as a computer readable medium.

According to an example of the disclosure, the first communication apparatus may be a vehicle, and the second communication apparatus may be a 5G network.

B. Signal Transmitting/Receiving Method in Wireless Communication System

Figure 2:
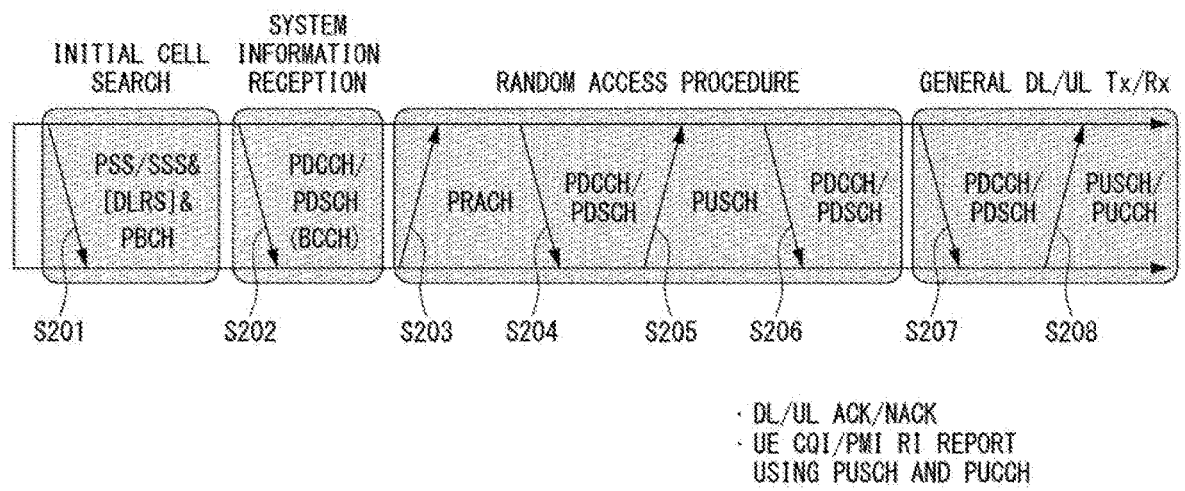
FIG. 2 is a diagram illustrating an example of a signal transmission/reception method in the wireless communication system.

FIG. 2 is a drawing illustrating an example of a signal transmitting/receiving method in a wireless communication system.

Referring to FIG. 2, UE performs initial cell search tasks of synchronizing with BS or the like when turning on power or entering a new cell (S201). For this, UE may receive a primary synchronization channel (P-SCH) and a secondary synchronization channel (S-SCH) to be synchronized with BS and acquire information such as cell ID and the like. In a LTE system and a NR system, the P-SCH and the S-SCH are referred to as a primary synchronization signal (PSS) and a secondary synchronization signal (SSS), respectively. After the initial cell search, UE may receive a physical broadcast channel (PBCH) to acquire broadcast information within a cell. Meanwhile, UE may receive a downlink reference Signal (DL RS) at the initial cell search step to check a downlink channel state. After finishing the initial cell search, UE may acquire more specific system information by receiving a physical downlink control channel (PDCCH) and a physical downlink shared channel (PDSCH) according to information carried by the PDCCH (S202).

Meanwhile, UE may perform a random access procedure (RACH) to BS when there is no wireless resource for initial access or signal transmission to BS (Steps S203 to S206). For this, UE may transmit a certain sequence as a preamble via a physical random access Channel (PRACH) (S203 and S205), and receive a random access response (RAR) message for the preamble via PDCCH and corresponding PDSCH (S204 and S206). In a case of a contention based RACH, a contention resolution procedure may be further performed.

After performing procedures described above, UE may perform PDCCH/PDSCH reception (S207), and physical uplink shared Channel (PUSCH)/physical uplink control channel (PUCCH) transmission (S208) as a general uplink/downlink signal transmission procedure. Particularly, UE receives downlink control information (DCI) via PDCCH. UE monitors a set of PDCCH candidates on monitoring occasions configured in one or more control element sets (CORESET) on a serving cell according to corresponding search space configurations. The set of PDCCH candidates to be monitored by UE may be defined in terms of search space sets, and the search space set may be a common search space set or an UE specific search space set. CORESET is configured with a set of (physic) resource blocks having time duration of 1 to 3 OFDM symbols. The network may be configured, such that UE has a plurality of CORESET. UE monitors PDCCH candidates in one or more search space sets. Here, monitoring means trying to decode PDCCH candidates in the search space. When UE succeeds in decoding one of the PDCCH candidates in the search space, the UE determines that PDCCH has been searched from corresponding PDCCH candidates, and performs PDSCH reception or PUSCH transmission based on DCI in detected PDCCH. PDCCH may be used to schedule DL transmission on PDSCH and UL transmissions on PUSCH. Here, DCI on PDCCH has a downlink assignment (i.e. downlink grant; DL grant), which at least includes the modulation and coding format and the resource allocation information associated with the downlink share channel, or uplink grant (UL grant) that contains the modulation and coding format and the resource allocation information associated with the uplink share channel.

Referring to FIG. 2, the initial access (IA) procedure in the 5G communication system will be further discussed.

UE may perform cell search, system information acquisition, beam alignment for initial access, DL measurement, and the like based on SSB. SSB is used mixed with a Synchronization Signal/Physical Broadcast channel (SS/PBCH) block.

SSB is configured with PSS, SSS and PBCH. SSB is configured in four continuous OFDM symbols, and PSS, PBCH, SSS/PBCH or PBCH is transmitted according to OFDM symbols. PSS and SSS are respectively configured with one OFDM symbol and 127 subcarriers, and PBCH is configured with three OFDM symbol and 576 subcarriers.

Cell search means a procedure in which UE acquires time/frequency of a cell, and detects cell ID (Identifier) (e.g., Physical layer Cell ID (PCI)) of the cell. PSS is used to detects the cell ID in a cell ID group, and SSS is used to detect a cell ID group. PBCH is used to detect SSB (time) index and a half-frame.

There are 336 cell ID groups and 3 cell IDs per cell ID group. There are 1008 cell IDs in total. Information on the cell ID group which the cell ID of the cell belongs to is provided/acquired via SSS of the cell, and information on the cell ID among 336 cells in the cell ID is provided/acquired via PSS.

SSB is periodically transmitted to SSB periodicity. At the initial cell search, SSB basic periodicity assumed by UE is defined as 20 ms. After cell access, SSB periodicity may be configured to be one of {5 ms, 10 ms, 20 ms, 40 ms, 80 ms, 160 ms} by the network (e.g., BS).

Next, the system information (SI) acquisition will be described.

SI is divided into a master information block (MIB) and a plurality of system information blocks (SIBs). SI other than MIB may be referred to as Remaining Minimum System Information (RMSI). MIB includes information/parameter for monitoring of PDCCH which schedules PDSCH carrying SIB1 (SystemInformationBlock1), and is transmitted by BS via PBCH of SSB. SIB1 includes information associated with the availability and scheduling (e.g., transmission cycles, SI-Windows sizes) of the remaining SIBs (hereinafter, referred to as SIBx, where x is an integer equal to or greater than 2). SIBx is included in SI message and transmitted via the PDSCH. Each SI message is transmitted within a periodically occurring time window (i.e., SI-Window).

Referring to FIG. 2, a random access (RA) process in the 5G communication system will be further discussed.

The random access process is used for a variety of purposes. For example, the random access process may be used for network initial access, handover and UE-triggered UL data transmission. UE may acquire UL synchronization and UL transmission resources through the random access process. The random access process is divided into a content-based random access process and a contention free random access process. Specific procedure for the contention based random access process is as follows.

UE may transmit the random access preamble as Msg1 of the random access process in UL via PRACH. Random access preamble sequences having two lengths different from each other are supported. The long sequence length 839 is applied to subcarrier spacing of 1.25 and 5 kHz, while the short sequence length 139 is applied to subcarrier spacing of 15, 30, 60 and 120 kHz.

When BS receives the random access preamble from UE, BS transmits the random access response (RAR) message (Msg2) to the UE. PDCCH, which schedules PDSCH carrying RAR, is CRC-masked by a random access (RA) wireless network temporary identifier (RNTI) (RA-RNTI) and transmitted. The UE which detects PDCCH masked by RA-RNTI may receive RARs from PDSCH which is scheduled by the DCI carried by the PDCCH. The UE checks that the random access response information for the preamble which has been transmitted by itself, i.e. Msg1, is within the RAR. Whether there is any random access information for Msg1 which has been transmitted by itself may be determined by whether there is a random access preamble ID for the preambles which has been transmitted by the UE. In the absence of a response to Msg1, the UE may retransmit the RACH preamble within a limited number of times while performing power ramping. The UE calculates the PRACH transmission power for retransmissions of the preamble based on the most recent path loss and power ramp counter.

Based on the random access response information, the UE may transmit UL transmission over the uplink sharing channel as Msg3 of the random access process. Msg3 may include RRC connection requests and UE identifiers. As a response to Msg3, the network may transmit Msg4, which may be treated as a contention resolution message on the DL. By receiving Msg4, the UE may enter into a RRC-connected state.

C. Beam Management (BM) Procedure of 5G Communication System

A BM process may be divided into (1) a DL BM process using SSB or CSI-RS, and (2) an UL BM process using SRS (sound reference signal). In addition, each BM process may include Tx beam sweeping to determine the Tx beam and Rx beam sweeping to determine the Rx beam.

DL BM process using SSB will now be described.

The setting for beam report using SSB is performed at channel state information (CSI)/beam setting in RRC_CONNECTED.

UE receives from BS, CSI-ResourceConfig IE containing CSI-SSB-ResourceSetList for SSB resources used for BM. The RRC parameter csi-SSB-ResourceSetList represents a list of SSB resources used for beam management and reporting in a set of resources. Here, the SSB resource set may be configured to be {SSBx1, SSBx2, SSBx3, SSBx4, . . . }. An SSB index may be defined as from 0 to 63.

The UE receives signals on SSB resources from the BS based on the CSI-SSB-Resource SetList.

If CSI-RS reportConfig associated with reporting of SSBRI and reference signal received power (RSRP) is established, the UE reports best SSBRI and RSRP corresponding to it to BS. For example, if the reportQuantity of the CSI-RS reportConfig IE is set to 'ssb-Index-RSRP', the UE reports the best SSBRI and RSRP corresponding to it to BS.

If CSI-RS resources are set to same OFDM symbol(s) as SSB, and 'QCL-TypeD' is applicable, the UE may assume that CSI-RS and SSB are quasi co-located (QCL) from a point of view of the 'QCL-TypeD'. Here, QCL-TypeD may mean being QCL between antenna ports from a point of view of a spatial Rx parameter. The same receive beam may be applied when the UE receives signals from multiple DL antenna ports in the QCL-TypeD relationship.

Next, DL BM process using CSI-RS will now be described.

The Rx beam determination (or refinement) process of the UE using CSI-RS and the Tx beam swiping process of the BS will be are discussed in order. The Rx beam determination process of UE is set for a repetition parameter to be 'ON', and the Tx beam swiping process of BS is set for the repetition parameter to be 'OFF'.

First, the Rx beam determination process of the UE will be described.

The UE receives NZP CSI-RS resource set IE, which includes RRC parameters for 'repetition', from the BS through RRC signalling. Here, the RRC parameter 'repetition' is set to be 'ON'.

The UE repeatedly receives from OFDM symbols different from each other via the same Tx beam of the BS (or DL space domain transmission filter), signals on the resource(s) in the CSI-RS resource set in which the RRC parameter 'repetition' is set to be 'ON'.

UE determines its RX beam.

The UE omits the CSI report. That is, if the RRC parameter 'repetition' is set to be 'ON', the CSI report may be omitted.

Next, the Rx beam determination process of the BS will be described.

The UE receives NZP CSI-RS resource set IE, which includes RRC parameters for 'repetition', from the BS through RRC signalling. Here, the RRC parameter 'repetition' is set to be 'OFF', and associated with the Tx beam sweeping process of BS.

The UE receives via the Tx beams of the BS different from each other (or DL space domain transmission filter), signals on the resources in the CSI-RS resource set in which the RRC parameter 'repetition' is set to be 'OFF'.

The UE selects (or determines) the best beam.

The UE reports the ID (e.g., CRI) and related quality information (e.g., RSRP) for the selected beam to BS. That is, the UE reports the CRI and RSRP for it to BS when CSI-RS is transmitted for BM.

Next, UL BM process using SRS will now be described.

The UE receives from the BS an RRC signalling (e.g., SRS-Config IE) containing the (RRC parameter) usage parameters set to 'beam management'. The SRS-Config IE is used for SRS transmission configuration. SRS-Config IE includes a list of SRS-Resources and a list of SRS-ResourceSets. Each SRS resource set means a set of SRS-resources.

The UE determines Tx beamforming for SRS resources to be transmitted based on the SRS-SpatialRelation Info included in SRS-Config IE. Here, the SRS-SpatialRelation Info is set for each SRS resources and indicates whether to apply the same beamforming as that used in SSB, CSI-RS, or SRS for each SRS resource.

If SRS-SpatialRelationInfo is set for an SRS resource, same beamforming as that used in SSB, CSI-RS, or SRS is applied and transmitted. However, if SRS-SpatialRelationInfo is not set in the SRS resource, the UE arbitrarily determines the Tx beamforming and transmits the SRS through the determined Tx beamforming.

Next, a beam failure recovery (BFR) process will be described.

In a beamformed system, Radio Link Failure (RLF) may occur frequently due to rotation, movement or blockage of the UE. Therefore, BFR is supported in NR to prevent frequent RLFs from occurring. BFR is similar to the radio link failure recovery process, and may be supported if the UE is aware of the new candidate beam(s). To detect beam failure, BS sets beam failure detection reference signals to the UE, which declares beam failure, when the number of beam failure indications from the physical layer of the UE reaches the threshold set by the RRC signalling within the period set by the RRC signalling of the BS. After beam failure has been detected, the UE triggers a beam failure recovery by initiating the random access process on the PCell; select an appropriate beam to perform the beam failure recovery (if the BS provides dedicated random access resources for certain beams, these are preferred by the UE). Upon completion of the random access procedure, the beam failure recovery is considered completed.

D. URLLC (Ultra-Reliable and Low Latency Communication)

URLLC transmission defined in NR may mean transmission for (1) relatively low traffic size, (2) relatively low arrival rate, (3) extremely low latency requirement (e.g., 0.5 and 1 ms), (4) relatively short transmission duration (e.g., 2 OFDM symbols), (5) urgent service/message, and the like. For UL, transmission for a particular type of traffic (e.g., URLLC) needs to be multiplexed with other pre-scheduled transmission (e.g., eMBB) in order to satisfy more stringent latency requirement. In this regard, one way is to inform the pre-scheduled UE that it will be preempted for a particular resource and to cause URLLC UE to use the corresponding resource in UL transmission.

For NR, dynamic resource sharing between eMBB and URLLC is supported. eMBB and URLLC services may be scheduled on non-overlapping time/frequency resources, and URLLC transmission may occur in resources scheduled for ongoing eMBB traffic. The eMBB UE may not know whether the PDSCH transmission of the corresponding UE was partially punctured, and because of corrupted coded bit, the UE may not be able to decode the PDSCH. Taking this into consideration, NR provides preemption indiction. The above preemption indication may be referred to as the interrupted transmission indication.

With respect to preemption indication, the UE receives the DownlinkPreemption IE through RRC signalling from the BS. When the UE is provided with DownlinkPreemption IE, for monitoring of the PDCCH carrying DCI format 2_1, the UE is set with the INT-RNTI provided by parameter int-RNTI in the DownlinkPreemption IE. The above UE is further set with a set of serving cells by INT-Configuration- PerServing Cell containing a set of serving cell indexes provided by servingCellID and corresponding sets of locations for fields in DCI format 2_1 by positionInDCI, is set with information payload size for DCI format 2_1 by dci-payloadSize, and is set with indication granularity of time-frequency resources by timeFrequencySect.

The UE receives DCI format 2_1 from the BS on the basis of the DownlinkPreemption IE.

If the UE detects DCI format 2_1 for a serving cell in an established set of serving cells, it may be assumed that among the PRBs and sets of symbols in the last monitoring period before the monitoring period to which the DCI format 2_1 belongs transmits to the DCI format 2_1, none of PRBs and symbols indicated by the DCI format 2_1 transmits to the UE. For example, the UE regards a signal in a time-frequency resource indicated by the preemption as not a scheduled DL transmission to itself, and decodes the data based on the signals received in the remaining resource areas.

E. mMTC (massive MTC)

Massive Machine Type Communication (mMTC) is one of 5G's scenarios to support hyper-connected services that communicate simultaneously with a large number of UEs. In this environment, the UE communicates intermittently with extremely low transmission speed and mobility. Therefore, mMTC makes the main goal of how long the UE can be operated at low cost. Regarding mMTC technology, 3GPP deals with MTC and NB (NarrowBand)-IoT.

The mMTC technology features repetitive transmission, frequency hopping, retuning, guard section or the like of PDCCH, PUCCH, PSCH (physical downlink shared channel), PUSCH, and the like.

That is, PUCCH (or PUCCH) containing specific information (or PUCCH (especially long PUCCH) or PRACH) and PDSCH (or PDCCH) containing responses to specific information are repeatedly transmitted. Repetitive transmission is performed via frequency hopping, for repetitive transmission, (RF) retuning is performed in a guard period from the primary frequency resource to the secondary frequency resource, and specific information and response to specific information are transmitted/received via narrowband (e.g., 6 RB (resource block) or 1 RB).

F. AI Basic Operation Using 5G-Communication

Figure 3:
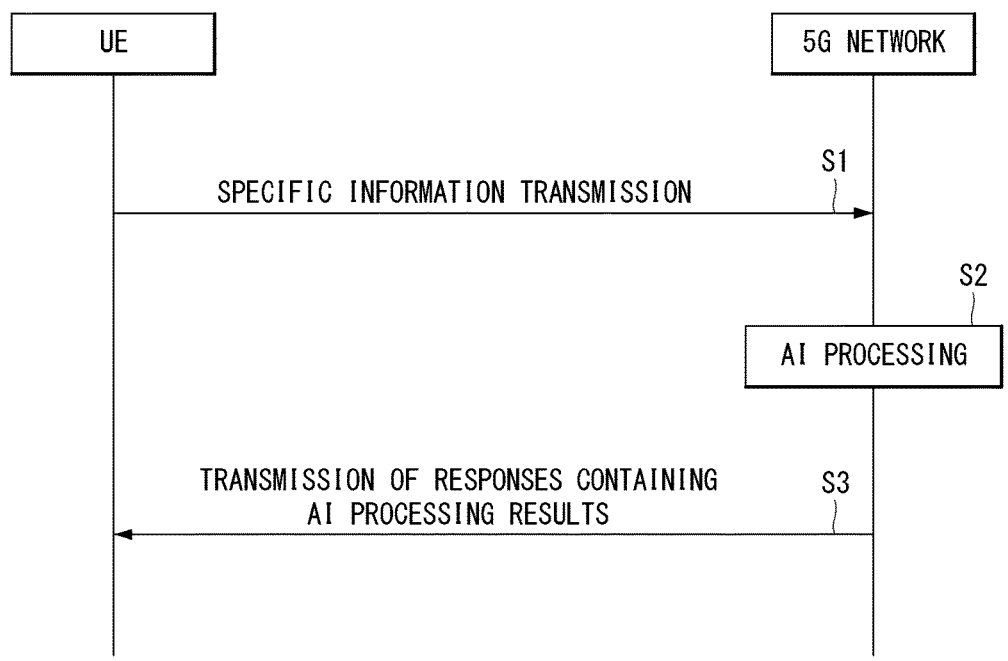
FIG. 3 is a diagram illustrating an example of basic operations of a user terminal and a 5G network in a 5G communication system.

FIG. 3 shows an example of the basic operation of a 5G network and a user terminal in a 5G communication system.

UE transmits specific information transmission to the 5G network (S1). And, the 5G network performs 5G processing for the specific information (S2). Here, the 5G processing may include AI processing. In addition, the 5G network transmits responses containing AI processing results to the UE (S3).

G. Application Operation Between the User's Terminal and the 5G Network on a 5G Communication System Hereinafter, AI operation using 5G communication will be more specifically described with reference to FIGS. 1 and 2, and wireless communication techniques (BM procedure, URLLC, Mmtc, and the like) discussed above.

First, the method proposed in this disclosure to be later described and the basic procedure of application operation applied by eMBB technology of 5G communication will be explained.

In order for the UE to transmit/receive signals, information or the like with 5G network, as in steps S1 and S3 of FIG. 3, the UE performs initial access procedures and random access procedures prior to step S1 of FIG. 3 altogether with 5G network.

More specifically, the UE performs initial access procedures together with 5G network based on the SSB to acquire DL synchronization and system information. In the initial access process, a beam management (BM) process, a beam failure recovery process may be added, and quasi-co location (QCL) relationship may be added in the process of the UE receiving signals from 5G network.

The UE also performs random access procedures together with 5G network for UL synchronization acquisition and/or UL transmission. And, the above 5G network may transmit UL grant to schedule the transmission of specific information to the UE. Therefore, the UE transmits specific information to the 5G network based on the UL grant. And, the 5G network transmits DL grant to schedule the transmission of result of 5G processing on specific information to the UE. Therefore, the 5G network may transmit responses containing AI processing results to the UE based on the above DL grant.

Next, the method proposed in this disclosure to be later described and the basic procedure of application operation applied by URLLC technology of 5G communication will be explained.

As described above, after the UE performs the initial access procedure and/or the random access procedure altogether with 5G network, the UE may receive the DownlinkPreemption IE from the 5G network. And, the UE receives DCI format 2_1 containing pre-emption indication from the 5G network based on DownlinkPreception IE. In addition, the UE does not perform (or expect or assume) the receipt of eMBB data from resources (PRB and/or OFDM symbols) indicated by the pre-emption indication. Then, the UE may receive UL grant from the 5G network if it needs to transmit certain information.

Next, the method proposed in this disclosure to be later described and the basic procedure of application operation applied by mMTC technology of 5G communication will be explained.

The part of the steps of FIG. 3, which is changed by the application of the mMTC technology, will be mainly described.

In the step S1 of FIG. 3, the UE receives UL grant from the 5G network in order to transmit certain information to the 5G network. Here, the UL grant may contain information on the number of repetitions for the transmission of specific information, which may be transmitted repeatedly based on information about the number of repetitions. That is, the UE transmits specific information to the 5G network based on the UL grant. And, repeated transmission of specific information may be made through frequency hopping, the first specific information may be transmitted at the first frequency resource, and the second specific information may be transmitted at the second frequency resource. The specific information may be transmitted through narrowband of 6 RB (Resource Block) or 1 RB (Resource Block).

5G communication technology described above may be combined with and applied to methods proposed in this to be described later, or may be provided to embody or clarify the technical features of the methods proposed in this disclosure.

Figure 4:
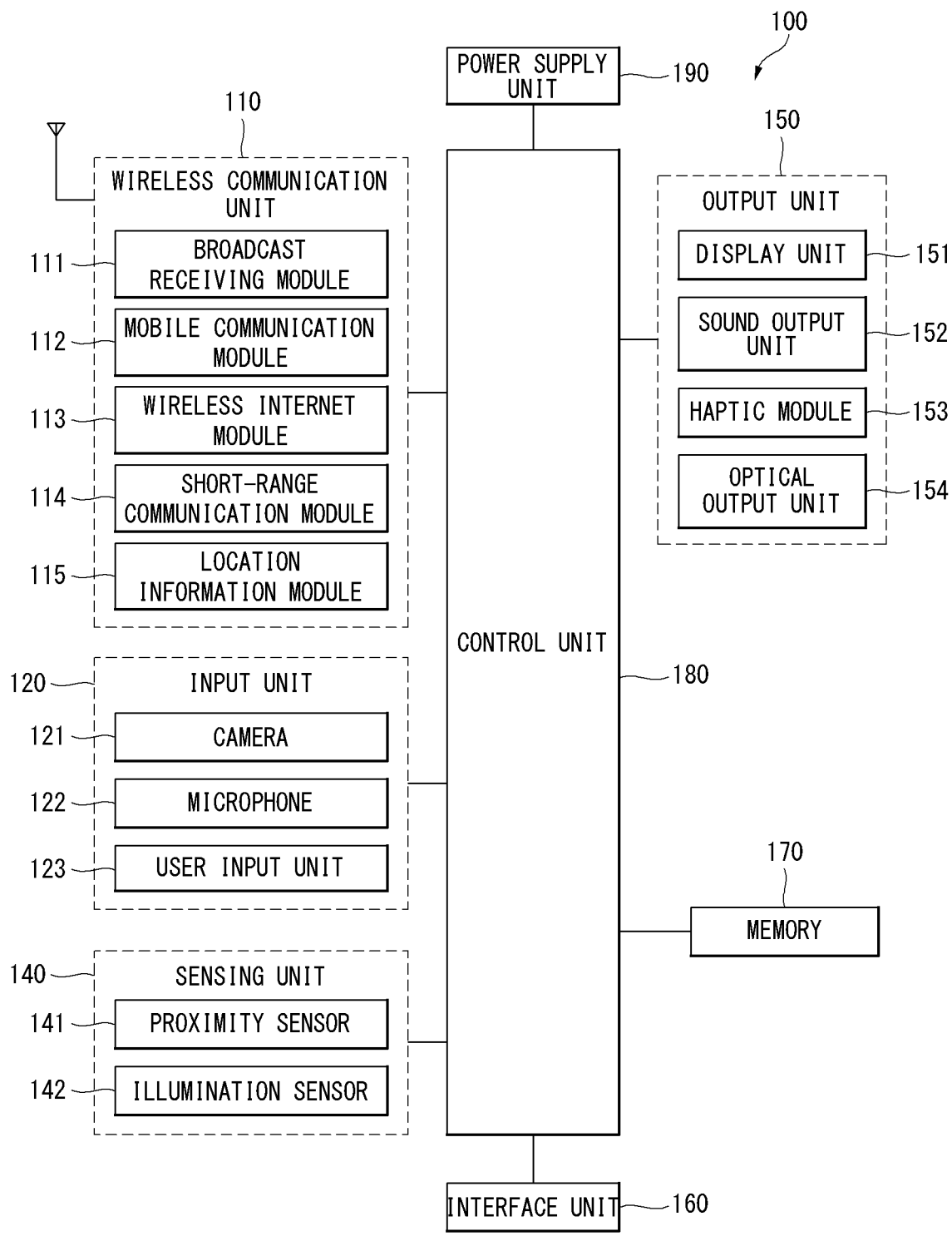
FIG. 4 is a block diagram for describing an electronic device according to the present disclosure.

FIG. 4 is a block diagram for describing an electronic device according to the present disclosure.

The electronic device 100 includes a wireless communication unit 110, an input unit 120, a sensing unit 140, an output unit 150, an interface unit 160, a memory 170, a control unit 180, and a power supply unit 190, and the like. The components shown in FIG. 1 are not essential to implementing electronic devices, so the electronic devices described herein may have more or fewer components than those listed above.

More specifically, the wireless communication unit 110 of the components may include one or more modules which enable wireless communication between the electronic device 100 and a wireless communication system, between the electronic device 100 and other electronic devices 100, or the electronic device 100 and an external server. In addition, the wireless communication unit 110 may include one or more modules which connect the electronic device 100 to one or more networks.

The wireless communication unit 110 may include at least one of a broadcast receiving module 111, a mobile communication module 112, a wireless Internet module 113, a short range communication module 114, and a location information module 115.

The input unit 120 may include a camera 121 or an image input unit for inputting an image signal, a microphone 122 for inputting a sound signal, an audio input unit, or a user input unit 123 (for example, a touch key, a push key, and the like) for receiving information from a user. Voice data or image data collected by the input unit 120 may be analyzed and processed as a control command of a user.

The sensing unit 140 may include one or more sensors for sensing at least one of information in the electronic device, surrounding environment information surrounding the electronic device, and user information. For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (for example, a camera (see 121)), a microphone (see 122), a battery gauge, an environmental sensor (for example, a barometer, a hygrometer, a thermometer, a radiation detection sensor, a thermal sensor, a gas sensor, and the like), and a chemical sensor (for example, an electronic nose, a healthcare sensor, a biometric sensor, and the like). Meanwhile, the electronic device disclosed herein may use a combination of information sensed by at least two or more of these sensors.

The output unit 150 is used to generate an output related to sight, hearing, tactile sense or the like, and may include at least one of a display unit 151, a sound output unit 152, a haptic module 153, and an optical output unit 154. The display unit 151 forms a layer structure with or is integrally formed with the touch sensor, thereby implementing a touch screen. The touch screen may function as the user input unit 123 which provides an input interface between the electronic device 100 and the user, and may provide an output interface between the electronic device 100 and the user.

The interface unit 160 serves as a path of various types of external devices connected to the electronic device 100. The interface unit 150 may include at least one of a wired/wireless headset port, an external charger port, a wired/wireless data port, a memory card port, a port for connection of a device including an identity module, an audio input/output (I/O) port, a video input/output (I/O) port, and an earphone port. In the electronic device 100, an appropriate control related to the connected external device may be performed in response to the connection of the external device to the interface unit 160.

In addition, the memory 170 stores data supporting various functions of the electronic device 100. The memory 170 may store a plurality of application programs or applications that are driven by the electronic device 100, and data for operating the electronic device 100, and instructions. At least some of these application programs may be downloaded from the external server via the wireless communication. In addition, at least some of these application programs may exist on the electronic device 100 from the time of shipment for basic functions (for example, an incoming and outgoing call function, a message reception and transmission function) of the electronic device 100. Meanwhile, the application program may be stored in the memory 170, installed on the electronic device 100, and driven by the control unit 180 to perform the operation (or function) of the electronic device.

In addition to the operation related to the application program, the control unit 180 typically controls the overall operation of the electronic device 100. The control unit 180 may provide or process appropriate information or a function to a user by processing signals, data, information, and the like, which are input or output through the above-described components, or by driving an application program stored in the memory 170.

In addition, the control unit 180 may control at least some of the components described with reference to FIG. 1 to drive the application program stored in the memory 170. In addition, the control unit 180 may operate at least two or more of the components included in the electronic device 100 in combination with each other to drive the application program.

The power supply unit 190 receives power from an external power source and an internal power source under the control of the control unit 180 and supply the received power to each component included in the electronic device 100. The power supply unit 190 includes a battery, which may be a built-in battery or a replaceable battery.

At least some of the components may operate in cooperation with each other in order to implement an operation, a control, or a control method of the electronic device according to various embodiments described below. In addition, the operation, control, or control method of the electronic device may be implemented on the electronic device by driving at least one application program stored in the memory 170.

Hereinafter, the components listed above will be described in more detail with reference to FIG. 4 before describing various embodiments implemented through the electronic device 100 described above.

First, referring to the wireless communication unit 110, the broadcast receiving module 111 of the wireless communication unit 110 receives a broadcast signal and/or broadcast related information from an external broadcast management server through a broadcast channel. The broadcast channel may include a satellite channel and a terrestrial channel. Two or more broadcast receiving modules may be provided to the electronic device 100 for simultaneous broadcast reception or broadcast channel switching for at least two broadcast channels.

The mobile communication module 112 transmits and receives a radio signal to and from at least one of a base station, an external terminal, and a server on a mobile communication network which is constructed according to technical standards or communication schemes for mobile communication (for example, global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A) and the like).

The radio signal may include various types of data according to transmission and reception of a voice call signal, a video call signal, or a text/multimedia message.

The wireless Internet module 113, which indicates a module for wireless Internet access, may be disposed inside or outside the electronic device 100. The wireless Internet module 113 is used to transmit and receive radio signals in communication networks related to wireless Internet technologies.

Examples of the wireless Internet technologies include wireless LAN (WLAN), wireless-fidelity (Wi-Fi), wireless fidelity (Wi-Fi) direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like. The wireless Internet module 113 transmits and receives data according to at least one wireless Internet technology in a range including the Internet technologies not listed above.

In view of the fact that the wireless Internet access by the WiBro, the HSDPA, the HSUPA, the GSM, the CDMA, the WCDMA, the LTE, the LTE-A, and the like is made through the mobile communication network, the wireless Internet module 113 for performing a wireless Internet access through the mobile communication network 113 may be understood as a kind of mobile communication module 112.

The short range communication module 114 is for short range communication, and may support short range communication using at least one of Bluetooth™, radio frequency identification (RFID), infrared data association (IrDA), ultra wideband (UWB), ZigBee, near field communication (NFC), wireless-fidelity (Wi-Fi), Wi-Fi Direct, wireless universal serial bus (wireless USB), and magnetic secure transmission (MST) technologies. The short range communication module 114 may support wireless communication between the electronic device 100 and a wireless communication system, between the electronic device 100 and other electronic devices 100, or the electronic device 100 and a network in which the other electronic devices 100 (or external server) are located through wireless area networks. The short range wireless communication network may be wireless personal area networks.

Here, other electronic devices 100 are wearable devices (for example, smartwatch, smart glass, smart glass, head mounted display (HMD)) capable of exchanging (or interworking) data with the electronic device 100 according to the present disclosure. The short range communication module 114 may detect (or recognize) the wearable devices which can communicate with the electronic devices 100 around the electronic device 100. Further, when the detected wearable device is a device which is authenticated to communicate with the electronic device 100 according to the present disclosure, the control unit 180 may include at least a part of data processed by the electronic device 100 to the wearable device through the short range communication module 114. Therefore, a user of the wearable device may use the data processed by the electronic device 100 through the wearable device. For example, according to this, when a call is received by the electronic device 100, the user can perform a phone call through the wearable device, or when a message is received by the electronic device 100, a user can check the message received through the wearable device.

The location information module 115 is a module for obtaining a location (or current location) of an electronic device, and a representative example thereof is a global positioning system (GPS) module or a wireless fidelity (WiFi) module. For example, if the electronic device utilizes the GPS module, the electronic device may acquire the location of the electronic device using the signal transmitted from the GPS satellite. As another example, when utilizing the Wi-Fi module, the electronic device may acquire the location of the electronic device based on information on a wireless access point (wireless AP) which transmits and receives a radio signal to and from the Wi-Fi module. If necessary, the location information module 115 may perform any function of other modules of the wireless communication unit 110 in order to substitute or additionally obtain data regarding the location of the electronic device. The location information module 115 is a module used to obtain the location (or current location) of the electronic device, and is not limited to a module which directly calculates or obtains the location of the electronic device.

Next, the input unit 120 is for inputting image information (or signal), audio information (or signal), data, or information input from a user, and the electronic device 100 may be provided with one or a plurality of cameras in order to input the image information. The camera 121 processes an image frame of a still image, a moving picture, or the like, obtained by an image sensor in a video call mode or a photographing mode. The processed image frame may be displayed on the display unit 151 or stored in the memory 170. On the other hand, the plurality of cameras 121 provided in the electronic device 100 may be arranged to have a matrix structure, and a plurality of pieces of image information having various angles or focuses may be input to the electronic device 100 through the camera 121 having the matrix structure. In addition, the plurality of cameras 121 may be arranged in a stereo structure to acquire a left image and a right image for implementing a stereoscopic image.

The microphone 122 processes external sound signals into electrical voice data. The processed voice data may be utilized in various ways according to a function (or an application program being executed) which is being performed by the electronic device 100. Meanwhile, the microphone 122 may include various noise removing algorithms for removing noise generated while receiving the external sound signals.

The user input unit 123 is for receiving information from a user, and when the information is input through the user input unit 123, the control unit 180 may control an operation of the electronic device 100 to correspond to the input information. The user input unit 123 may include mechanical input means (or mechanical keys such as buttons, dome switches, jog wheels, and jog switches) and touch input means which is located on a front surface, a back surface, or side surfaces of the electronic device 100. As an example, the touch input means may include a virtual key, a soft key, or a visual key displayed on a touch screen through software processing, or a touch key disposed at a portion other than the touch screen. Meanwhile, the virtual key or the visual key can be displayed on the touch screen while having various forms, and may be implemented in graphic, text, icon, video, or a combination thereof.

Meanwhile, the sensing unit 140 senses at least one of information in the electronic device, surrounding environment information surrounding the electronic device, and user information, and generates a sensing signal corresponding to the sensed information. The control unit 180 may control the driving or operation of the electronic device 100 or perform data processing, a function, or an operation related to an application program installed in the electronic device 100 based on the sensing signal. Representative sensors among various sensors that may be included in the sensing unit 140 will be described in more detail.

First, the proximity sensor 141 refers to a sensor which detects the presence or absence of an object approaching a predetermined detection surface or the presence or absence of an object existing in the vicinity of the predetermined detection surface using an electromagnetic force, infrared rays, or the like without a mechanical contact. The proximity sensor 141 may be disposed in an inner region of the electronic device covered by the touch screen as described above or near the touch screen.

Examples of the proximity sensor 141 include a transmission type photoelectric sensor, a direct reflection type photoelectric sensor, a mirror reflection type photoelectric sensor, a high-frequency oscillation type proximity sensor, a capacitive proximity sensor, a magnetic proximity sensor, and an infrared proximity sensor. In the case of the capacitive touch screen, the proximity sensor 141 may be configured to detect the proximity of the object based on a change in an electric field depending on how proximate the proximity sensor 141 is to the object. In this case, the touch screen (or touch sensor) itself may be classified as the proximity sensor.

On the other hand, for convenience of explanation, an action of detecting that the object is located on the touch screen by being proximate to the object without being in contact with the touch screen is called a "proximity touch", and an action of actually contacting an object on the touch screen is called a "contact touch". The location at which the object is in proximity touch on the touch screen means a location where the object is perpendicular to the touch screen when the object is in proximity touch. The proximity sensor 141 may detect the proximity touch and the proximity touch pattern (for example, a proximity touch distance, a proximity touch direction, a proximity touch speed, a proximity touch time, a proximity touch location, a proximity touch movement state, and the like). Meanwhile, the control unit 180 may process data (or information) corresponding to the proximity touch operation and the proximity touch pattern detected by the proximity sensor 141 as described above, and furthermore, output visual information corresponding to the processed data onto the touch screen. Furthermore, the control unit 180 may control the electronic device 100 to process different operations or data (or information) according to whether the touch to the same point on the touch screen is the proximity touch or the contact touch.

The touch sensor detects a touch (or touch input) applied to the touch screen (or the display unit 151) using at least one of various touch types such as a resistive film type, a capacitive type, an infrared type, an ultrasonic type, and a magnetic field type.

As an example, the touch sensor may be configured to convert a change in pressure applied to a specific portion of the touch screen, a change in capacitance generated at the specific portion, or the like into an electrical input signal. The touch sensor may be configured to detect a location, an area, a pressure at the time of touch, a capacitance at the time of touch, and the like of a touch object which applies a touch to the touch screen. Here, the touch object is an object applying a touch to the touch sensor and may be, for example, a finger, a touch pen, a stylus pen, a pointer, or the like.

As such, when there is a touch input to the touch sensor, the corresponding signal(s) is transmitted to a touch controller. The touch controller processes the signal(s) and then transmits the corresponding data to the control unit 180. As a result, the control unit 180 can know which area of the display unit 151 is touched, and the like. Here, the touch controller may be a separate component from the control unit 180 or may be the control unit 180 itself.

Meanwhile, the control unit 180 may perform different control or perform the same control according to a type of touch object which touches the touch screen (or a touch key provided in addition to the touch screen). It may be determined whether to perform different control or the same control according to the type of touch object according to a current operation state of the electronic device 100 or an application program being executed.

Meanwhile, the touch sensor and the proximity sensor described above may be independently or combined, and may sense various types of touches such as a short (or tap) touch, a long touch, a multi touch, a drag touch, a flick touch, a pinch-in touch, a pinch-out touch, a swipe touch, and a hovering touch to the touch screen.

The ultrasonic sensor may recognize location information on a detection object using ultrasonic waves. On the other hand, the control unit 180 can calculate a location of a wave generation source through the information detected from an optical sensor and a plurality of ultrasonic sensors. The location of the wave generation source can be calculated using the property that light is much faster than the ultrasonic wave, that is, the property that the time that light reaches the optical sensor is much faster than the time when the ultrasonic wave reaches the ultrasonic sensor. More specifically, the location of the wave generation source may be calculated using a time difference from the time when the ultrasonic wave reaches the light as a reference signal.

On the other hand, the camera 121, which has been described as the configuration of the input unit 120, includes at least one of a camera sensor (for example, CCD, CMOS, and the like), a photo sensor (or an image sensor), and a laser sensor.

The camera 121 and the laser sensor may be combined with each other to detect a touch of a detection object on a 3D stereoscopic image. The photo sensor may be stacked on a display element, and the photo sensor is configured to scan the movement of the detection object which is proximate to the touch screen. More specifically, the photo sensor mounts a photo diode and a transistor (TR) in a row/column and scans contents mounted on the photo sensor by using an electrical signal which varies according to the amount of light applied to the photo diode. That is, the photo sensor calculates coordinates of the detection object according to the amount of change of light, and thus, the location information of the detection object can be obtained.

The display unit 151 may display (output) information processed by the electronic device 100. For example, the display unit 151 may display execution screen information of an application program driven by the electronic device 100, or user interface (UI) or graphic user interface (GUI) information according to the execution screen information.

In addition, the display unit 151 may be configured as a stereoscopic display unit for displaying a stereoscopic image.

The stereoscopic display unit may be a three-dimensional display type such as a stereoscopic type (glasses type), an auto stereoscopic type (glass-free method), a projection type (holographic type).

The sound output unit 152 may output audio data received from the wireless communication unit 110 or stored in the memory 119 in a call signal receiving mode, a call mode or a recording mode, an audio recognizing mode, a broadcasting receiving mode, or the like. The sound output unit 152 may also output a sound signal related to a function (for example, a call signal reception sound or a message reception sound) performed in the electronic device 100. The sound output unit 152 may include a receiver, a speaker, a buzzer, or the like.

The haptic module 153 generates various tactile effects that a user can feel. A representative example of the tactile effect generated by the haptic module 153 may be vibration. The intensity, pattern, and the like of the vibration generated by the haptic module 153 may be controlled by the user's selection or the setting of the control unit. For example, the haptic module 153 may synthesize and output different vibrations or sequentially output vibrations.

In addition to the vibration, the haptic module 153 may generate various tactile effects such as effects by stimulations such as a pin array which vertically moves with respect to a contact skin surface, a jetting force or a suction force of air through a nozzle or an inlet, grazing to a skin surface, a contact of an electrode, an electrostatic force and effects by a reproduction of cold/hot feeling using an element which can absorb or generate heat.

The haptic module 153 may be implemented to not only deliver a tactile effect through a direct contact, but also enable a user to feel a tactile effect through a muscle sense such as a finger or an arm. Two or more haptic modules 153 may be provided according to a configuration aspect of the electronic device 100.

The optical output unit 154 outputs a signal for notifying a generation of an event by using light from a light source of the electronic device 100. Examples of events generated in the electronic device 100 may include message reception, call signal reception, a missed call, an alarm, schedule notification, email reception, information reception through an application, and the like.

The signal output from the optical output unit 154 is implemented to allow the electronic device to emit light of a single color or a plurality of colors to the front surface or the back surface. The signal output may be terminated by allowing the electronic device to detect the user's event confirmation.

The interface unit 160 serves as a path to all the external devices connected to the electronic device 100. The interface unit 160 receives data or power transmitted or supplied from the external device to transmit the data or the power to each component in the electronic device 100 or transmits data in the electronic device 100 to the external device. The interface unit 160 may include, for example, a wired/wireless headset port, an external charger port, a wired/wireless data port, a memory card port, a port for connection of a device including an identity module, an audio input/output (I/O) port, a video input/output (I/O) port, an earphone port, and the like.

On the other hand, the identification module is a chip which stores a variety of information for authenticating a use authorization of the electronic device 100, and may include a user identification module (UIM), a subscriber identity module (SIM), a universal user authentication (USIM), and the like. A device equipped with the identification module (hereinafter, referred to as an 'identification device') may be manufactured in a form of a smart card. Therefore, the identification device may be connected to the terminal 100 through the interface unit 160.

In addition, when the electronic device 100 is connected to an external cradle, the interface unit 160 may be a path through which power is supplied from the cradle to the electronic device 100 or may be a path through which various command signals input from the cradle by a user are transmitted to the electronic device 100. Various command signals or the power input from the cradle may operate as signals for recognizing that the electronic device 100 is correctly mounted on the cradle.

The memory 170 may store a program for the operation of the control unit 180, and temporarily store input/output data (for example, a phonebook, a message, a still image, a moving image, and the like). The memory 170 may store data on various patterns of vibrations and sounds which are output at the time of inputting a touch onto the touch screen.

The memory 170 may include at least one of a flash memory type storage medium, a hard disk type storage medium, a solid state disk type (SSD type), a silicon disk drive type (SDD type), a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The electronic device 100 may also operate in connection with a web storage performing a storage function of the memory 140 on the Internet.

On the other hand, as described above, the control unit 180 controls the operation related to the application program, and typically controls the overall operation of the electronic device 100. For example, when the state of the electronic device satisfies a set condition, the control unit 180 may execute or release a lock state which limits an input of a user's control command to applications.

In addition, the control unit 180 may perform control and processing related to a voice call, data communication, a video call, or the like, or may perform pattern recognition processing for recognizing a handwriting input or a drawing input performed on a touch screen as text and an image, respectively. Furthermore, in order to implement various embodiments described below on the electronic device 100 according to the present disclosure, the control unit 180 may control any one of the components described above or a combination of the components.

The power supply unit 190 receives external power or internal power by the control of the control unit 180 and supplies power required for operating the respective components. The power supply unit 190 includes a battery, and the battery may be a built-in battery configured to be rechargeable, and may be detachably coupled to a terminal body for charging and the like.

In addition, the power supply unit 190 may be provided with a connection port, and the connection port may be configured as an example of the interface 160 electrically connected to the external charger for supplying power for charging the battery.

As another example, the power supply unit 190 may be configured to charge the battery in a wireless manner without using the connection port. In this case, the power supply unit 190 may receive power from an external wireless power transmitter using at least one of an inductive coupling type based on a magnetic induction phenomenon or a magnetic resonance coupling type based on an electromagnetic resonance phenomenon. In the present disclosure, the electronic device 100 may be collectively referred to as a terminal.

Figure 5:
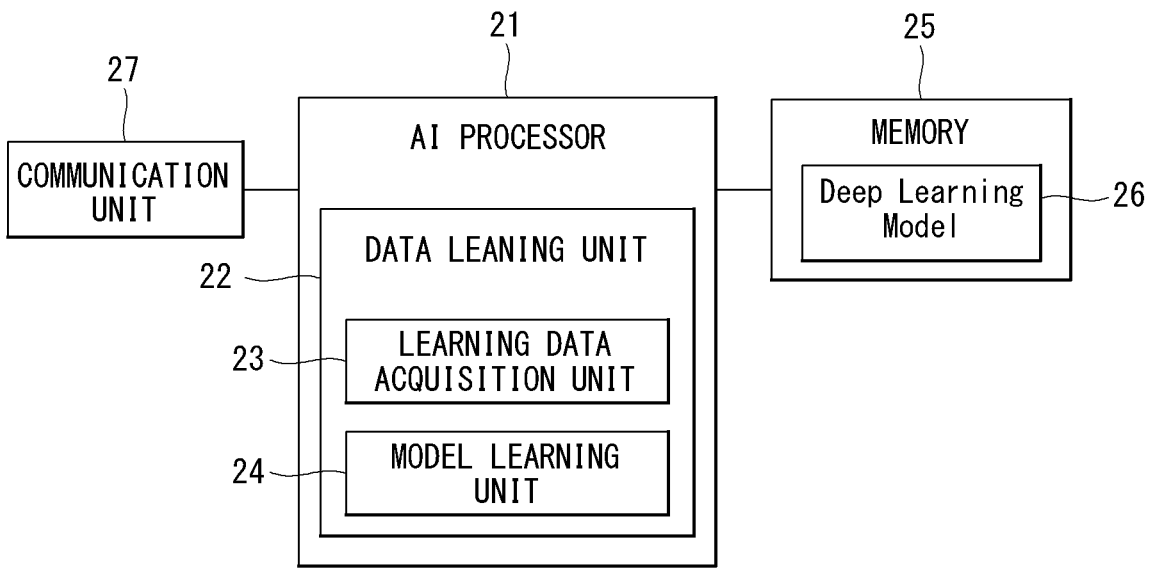
FIG. 5 is a block diagram of an AI device according to an embodiment of the present disclosure.

FIG. 5 is a block diagram of an AI device according to an embodiment of the present disclosure.

An AI device 20 may include an electronic device including an AI module capable of performing AI processing, a server including the AI module, or the like. In addition, the AI device 20 may be included in at least a part of the electronic device 100 shown in FIG. 4 and may be provided to perform at least a part of the AI processing together.

The AI device 20 may include an AI processor 21, a memory 25, and/or a communication unit 27.

The AI device 20 is a computing device capable of learning neural networks, and may be implemented as various electronic devices such as a server, a desktop PC, a notebook PC, and a tablet PC.

The AI processor 21 may learn neural networks using programs stored in the memory 25. Specifically, the AI processor 21 may learn neural networks for recognizing vehicle-related data. Here, neural networks for recognizing vehicle-related data may be designed to simulate the structure of the human brain on a computer, and include multiple weighted network nodes that simulate the neurons of the human neural network. Multiple network modes may send and receive data according to each connection relationship to simulate the synaptic activity of a neuron sending and receiving signals through a synapse. Here, neural networks may include deep learning models developed from neural network models. In the deep-learning model, multiple network nodes are located in different layers and may send and receive data according to the convolution connection relationship. Examples of neural network models include deep neural networks (DNNs), convolutional deep neural networks (CNNs), Recurrent neural networks (RNNs), Restricted Boltzmann Machine (RBM), deep belief networks (DBNs), Deep Q-Network and the like, and may be applied to fields such as computer vision, voice recognition, natural language processing, voice/signal processing and the like.

Meanwhile, processors that perform the above-described functions may be general processors (e.g., CPU), but they may be AI-only processors (e.g., GPU) for artificial intelligence learning.

The memory 25 may store various programs and data that are needed for operation of the AI apparatus 20. The memory 25 may be embodied by nonvolatile memory, volatile memory, flash-memory, hard disk drive (HDD), solid state drive (SDD) or the like. The memory 25 may be accessed by the AI processor 21, and data may be read/recorded/modified/deleted/renewed by the AI processor 21. Further, the memory 25 may store neural network models (e.g., the deep learning model 26) generated via learning algorithms for data classification/recognition according to an example of this disclosure.

Meanwhile, the AI processor 21 may include a data learning unit 22 that learns the neural network for data classification/recognition. The data learning unit (22) may learn the criteria for which learning data is used to determine data classification/recognition and how data is classified and recognized using learning data. The data learning unit 22 may learn the deep learning model by acquiring the learning data to be used for learning and applying the acquired learning data to the deep learning model.

The data learning unit 22 may be manufactured in the form of at least one hardware chip and may be mounted on AI apparatus 20. For example, the data learning unit, 22 may be manufactured in the form of a dedicated hardware chip for artificial intelligence (AI), or manufactured as a part of a general processor (CPU) or a graphics-only processor (GPU) and be mounted on an AI apparatus 20. Further, the data learning unit 22 may be embodied by a software module. If embodied by a software module (or a program module containing instructions), the software module may be stored in a non-transitory readable recording media which can be read by computer. In this case, at least one software module may be provided by an operating system (OS) or by an application.

The data learning unit 22 may include the learning data acquisition unit 23 and the model learning unit 24.

The learning data acquisition unit 23 may acquire the learning data needed for neural network models to classify and recognize the data. For example, the learning data acquisition unit 23 is learning data, which may be acquired from vehicle data and/or sample data for input into the neural network model.

Using the above acquired learning data, the model learning unit 24 may learn to allow a neural network model to have criteria for determining how to classify predetermined data. At this time, the model learning unit 24 may make the neural network model learn via a supervised learning which uses at least some of the learning data as a basis for judgment. Alternatively, the model learning unit 24 may learn by itself using learning data without supervision, so that the neural network model is made learn via unsupervised learning which discovers judgment criteria. Further, the model learning unit 24 may make the neural network model learn via reinforcement learning by using feedback on whether the results of learning-based situational judgments are correct. Further, the model learning unit (24) may make a neural network model learn using learning algorithms that include error back-propagation or gradient descent.

Once the neural network model is learned, the model learning unit 24 may store the learned neural network model in a memory. The model learning unit 24 may store the learned neural network model in a memory of servers connected by a wired or wireless network with the AI apparatus 20.

The data learning unit 22 may further include a learning data preprocessing unit (not shown) and a learning data selecting unit (not shown) to improve the analysis results of the recognition model or to save time or resources required to create the recognition model.

The learning data preprocessing unit may preprocess the acquired data so that the acquired data can be used for learning for situation determination. For example, the learning data preprocessing unit may process the acquired data in the previously established format so that the model learning unit 24 can use the acquired learning data for learning for image recognition.

Further, the learning data selecting unit may select data necessary for learning from the learning data acquired in the learning data acquisition unit 23 and the learning data preprocessed in the pre-processing unit. Selected learning data may be provided to the model learning unit 24. For example, the learning data selecting unit may select data only for objects in a specific area by detecting specific areas of the image acquired through the vehicle's camera.

Further, the data learning unit 22 may further include a model evaluation unit (not shown) to improve the analysis results of the neural network model.

The model evaluation unit may make the model learning unit 22 learn again if the evaluation data is input into the neural network model and the analysis result output from the evaluation data does not meet the predetermined standard. In this case, the evaluation data may be data which have been already defined for evaluating the recognition model. For example, the model evaluation unit may evaluate that if the number or percentage of the evaluation data whose analysis result is not correct among the analysis results of the learned recognition model for the evaluation data, exceeds predetermined threshold, it does not meet the predetermined standard.

The communication unit 27 may transmit AI processing results by the AI processor 21 to external electronic devices.

Here, the external electronic device may be defined as an autonomous driving vehicle. In addition, the AI device 20 may be defined as another vehicle or 5G network which communicates with an autonomous driving module vehicle. Meanwhile, the AI device 20 may be implemented by being functionally embedded in the autonomous driving module provided in the vehicle. In addition, the 5G network may include a server or a module which performs autonomous driving related control. In addition, the AI device 20 may be implemented through a home server.

Meanwhile, the AI device 20 illustrated in FIG. 5 has been described functionally divided into the AI processor 21, the memory 25, the communication unit 27, and the like. However, note that the aforementioned components are integrated into one module and may be referred to as an AI module.

Deep Neural Network (DNN) Model

Figure 6:
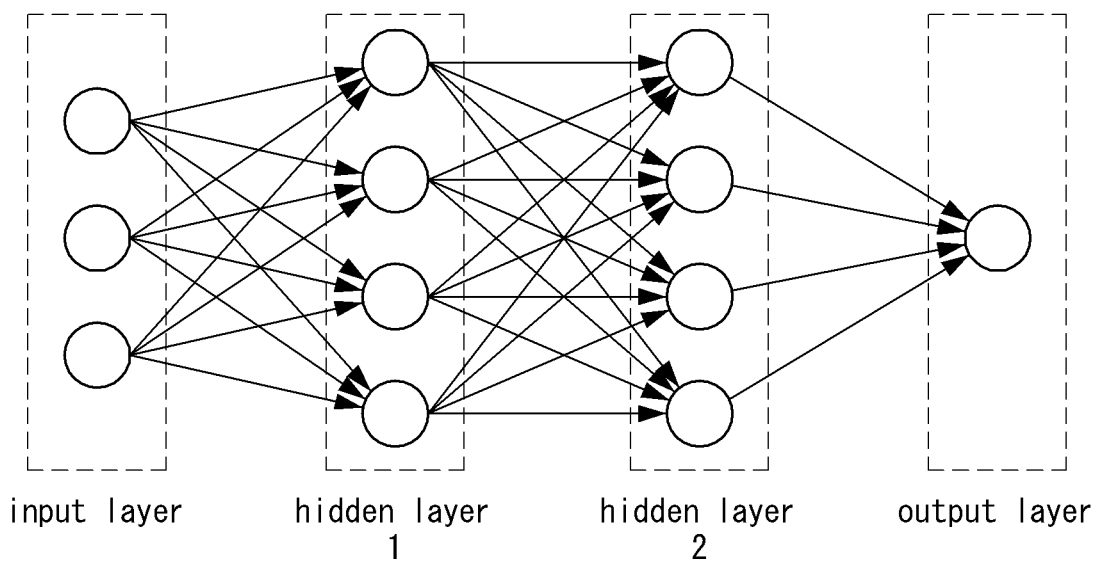
FIG. 6 is a diagram illustrating an example of a DNN model to which the present disclosure can be applied.

FIG. 6 is an example of a DNN model to which the present disclosure can be applied.

The Deep Neural Network (DNN) is an artificial Neural Network (ANN) formed with several hidden layers between an input layer and an output layer. The Deep Neural Networks may model complex non-linear relationships, as in a typical artificial neural networks.

For example, in the deep neural network structure for an object identification model, each object may be represented by a hierarchical configuration of the image basic elements. At this time, the additional layers may aggregate the characteristics of the gradually gathered lower layers. This feature of deep neural networks allows more complex data to be modeled with fewer units (nodes) than similarly performed artificial neural networks.

As the number of hidden layers increases, the artificial neural network is called "deep," and machine learning paradigm that uses such a sufficiently deepened artificial neural network as a learning model is called deep learning. And, the sufficiently deep artificial neural network used for such deep learning is commonly referred to as the Deep Neural network (DNN).

In the present disclosure, data required for learning an OCR model may be input to the input layer of the DNN, and meaningful data which can be used by a user through the output layer may be generated through the output layer while the data required for learning pass through the hidden layers.

In the specification of the present disclosure, the artificial neural network used for such a deep learning method is collectively referred to as DNN. However, if the meaningful data can be output in a similar manner, other deep learning methods may be applied.

Deep Learning-Based Optical Character Recognition (OCR) Model

Figure 7:
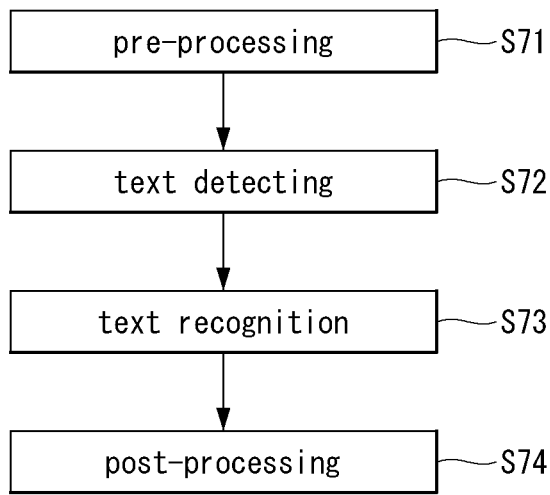
FIG. 7 is a diagram illustrating an example of an OCR model to which the present disclosure can be applied.

FIG. 7 is a diagram illustrating an example of an OCR model to which the present disclosure can be applied.

The OCR model is an automatic recognition technology which converts text and images on prints or photographs into digital data. Examples of the use of technology include the recognition of text on a business card or handwriting information on paper. The conventional OCR model operates as a granular module such as a module for finding a text line and a module for dividing a letter. Features which recognize different patterns of these letters had to be directly designed by a developer. In addition, limited operation was possible only in high quality images.

In recent years, the field of the OCR uses deep learning to improve accuracy than before, and generates a feature extraction which recognizes text in images through massive data learning. The following is an example of the OCR model using the deep learning technology.

S71: Pre-Processing

A computer can recognize pixels having similar brightness values as a chunk, thereby making it easier to detect letters which are different in color from their surroundings and have different consecutive point structures. For this purpose, the recognition rate can be greatly improved through the pre-processing process.

An example of such a pre-processing process is as follows. A low-color image is converted into grayscale. Next, histogram equalization is performed. By redistributing the distribution of brightness in the image to maximize contrast, sharper images can be obtained. However, there is still a limit in clearly distinguishing the background from the characters. To solve this problem, binarization is performed. If a pixel value is 255 (white), it is changed to '0', and if a pixel value is 0 to 254 (gray and black), it is changed to '1'. As a result, the background and the text can be separated more clearly.

S72: Text Detecting

After an image is put into the DNN, feature values are obtained. Data to be obtained is a text box and a rotation angle of the text box. Picking out text areas from the input image can reduce unnecessary computation. Rotation information is used to make a tilted text box horizontal. Next, the image is cut in a text unit. After this step, individual character images or word images can be obtained.

S73: Text Recognition

To recognize which text each cut image includes, the DNN is used. The DNN learns a method for recognizing individual words and letters in a form of an image. On the other hand, types of words or strings that the DNN can recognize vary from language to language. Therefore, for general purpose OCR, it is also necessary to have a module for estimating language using only images.

S74: Post-Processing

The OCR post-processes letter recognition errors in a similar way that humans accept text. There are two methods. A first method is a method for using features of each letter. The errors are corrected by distinguishing similar letters (similar pairs) such as 'il/mil', 'mayang/yang', and 'pa/ta'. A second method is a method for using context information. To this end, a language model or a dictionary is required, and a language model which learns a lot of text data on a web is built with deep learning.

An object of the present disclosure is to apply the existing deep learning-based OCR model in a more advanced form through federated learning, which will be described later.

To perform a process of converting handwritten characters input with a touch of a finger or a touch pen into text in a smart phone, a smart pad, an edge device, or the like, a deep learning-based handwritten character recognition model is learned in a server with a large amount of labeled learning data. However, even in the case of the handwritten character recognition model learned with a large amount of data, errors inevitably occurs when new handwritten character data are input in an actual use environment.

The method for learning a handwritten character recognition model proposed by the present disclosure is a method for performing learning by directly acquiring data generated through an inference error of a model in an edge device, which is environment in which an actual model is used and then transmitting learned results to a model average server and merging the learned results to thereby make a more improved handwritten character recognition model, and transmitting the more improved handwritten character recognition model to each edge device.

Federated Learning

Figure 8:
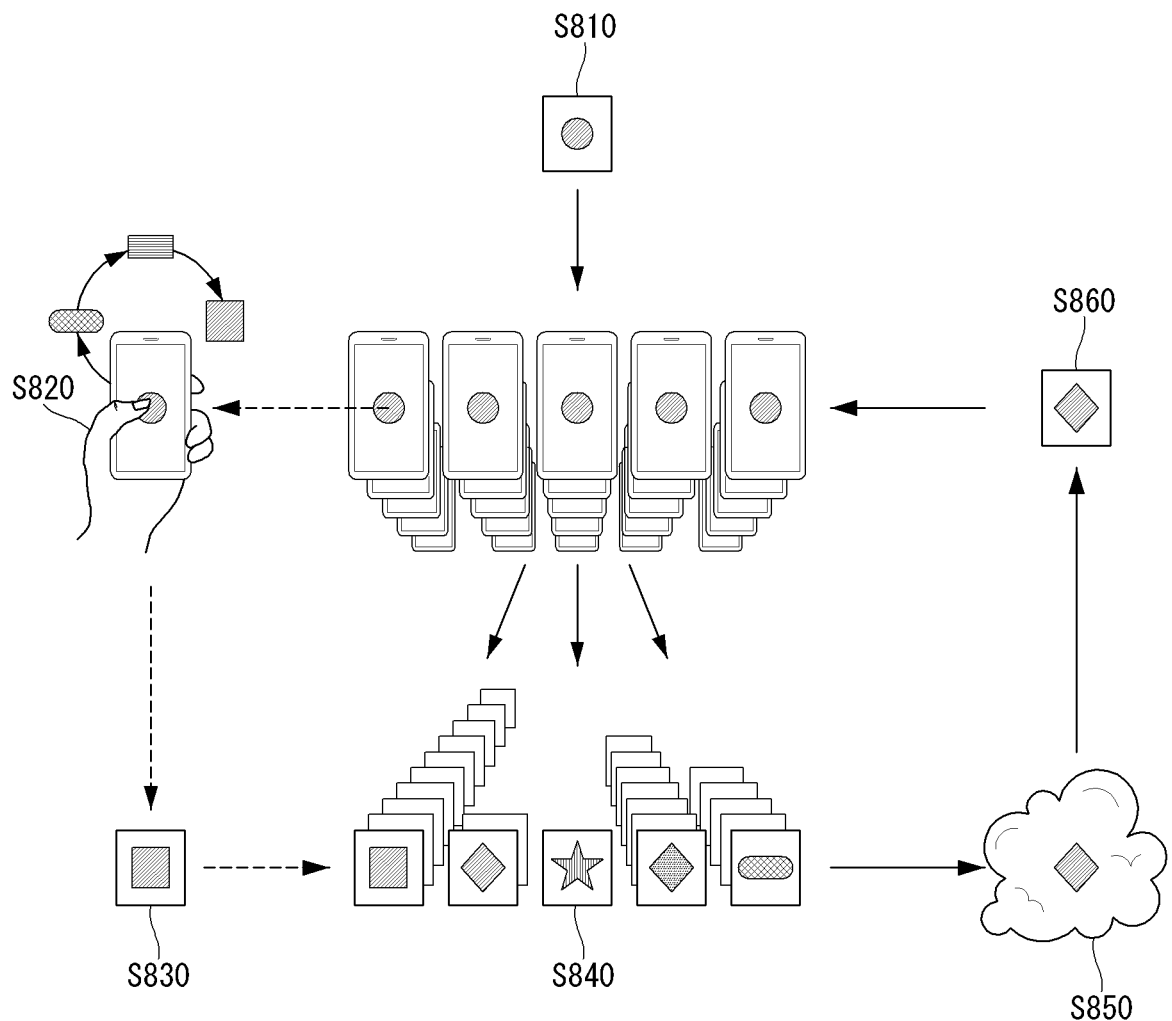
FIG. 8 is a diagram illustrating an example of a federated learning technology to which the present disclosure can be applied.

FIG. 8 is a diagram illustrating an example of a federated learning technology to which the present disclosure can be applied.

In the case of using the federated learning, terminals can manage prediction data and use a common prediction model to perform learning jointly, and therefore there is no need to store the data in a separate server or cloud.

To this end, all the terminals download the current common prediction model (S810). The terminal improves the learning of the prediction model based on the data of the terminal according to a use of a user (S820). The terminal may improve the learning of the prediction model and then generate these changes as update data (S830). Prediction models of many terminals can be learned by reflecting various usage environment and user characteristics (S840). Update data of each terminal is transmitted to the cloud server through communication, which can be used to improve the common prediction model (S850). The improved common prediction model may be distributed to each terminal again (S860). The terminal may learn such a prediction model again, and repeats the step of improving the common prediction model, thereby developing and sharing the common prediction model.

This has the following differences from the existing method for learning a handwritten character recognition model. Since the user's data are not collected directly, the problem of personal information leakage does not occur. Data collected in any environment are not used to learn the model, but real-world data are used to learn the model. In addition, there is no additional cost for data acquisition because a user directly performs data labeling, and a separate learning server is not necessary because model learning takes place at each user's device. In addition, the problem of personal information leakage is solved by collecting only weights, which are a collection of float numbers, which are transformed results, without transmitting individual raw data to a server.

Figure 9:
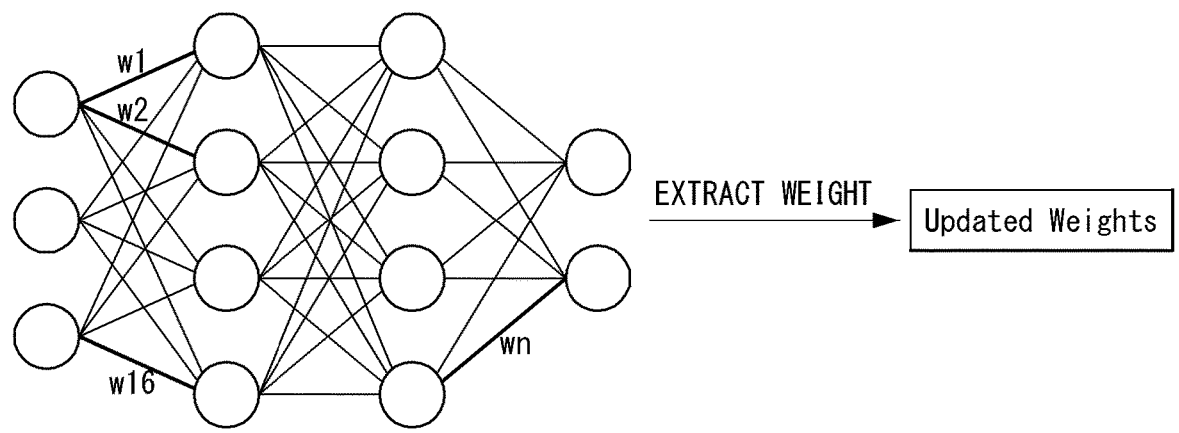
FIG. 9 is a diagram illustrating an example of weights to which the present disclosure can be applied.

FIG. 9 is a diagram illustrating an example of weights to which the present disclosure can be applied.

The weight means a set of variables that can be learned by the neural network of the deep learning. In order to improve the common prediction model, the update data of each terminal may be generated in the form of a weight. Through the prediction model of each terminal, the generated weight may be represented by, for example, W=[w1, w2, . . . , wn]. The weight can be uploaded to the server and used to improve the common prediction model.

Figure 10:
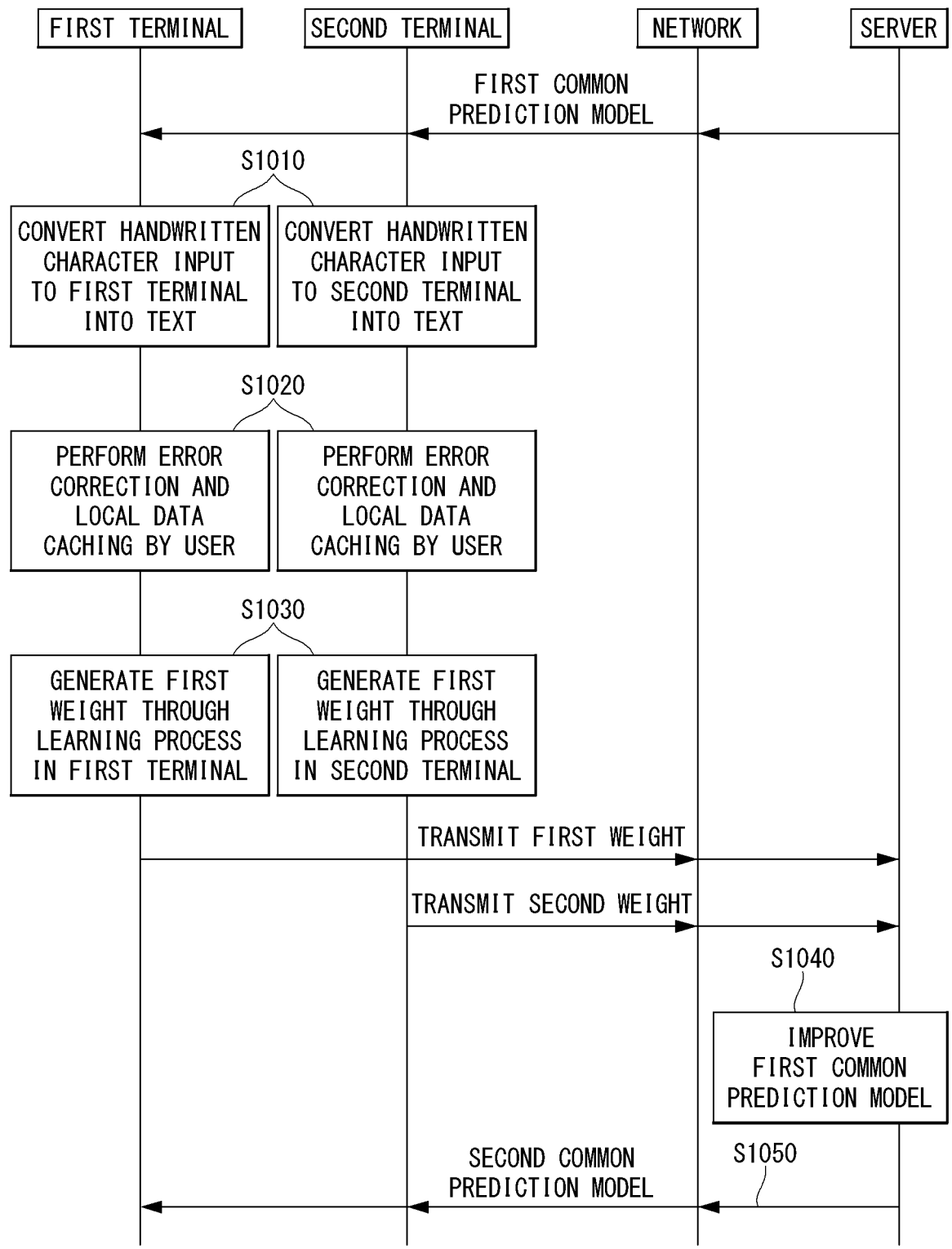
FIG. 10 is a diagram illustrating an embodiment to which the present disclosure can be applied.

FIG. 10 is a diagram illustrating an embodiment to which the present disclosure can be applied.

The overall learning process of the present disclosure can be made in the following five steps, for example. A case where steps 1 or 5 are carried out once is called round 1 and each round can be learned over and over again to improve the handwritten character recognition model.

S1010: Convert handwritten characters into text

Each terminal downloads a first common prediction model from a server. Each terminal converts handwritten characters into text using the first common prediction model received.

Figure 11:
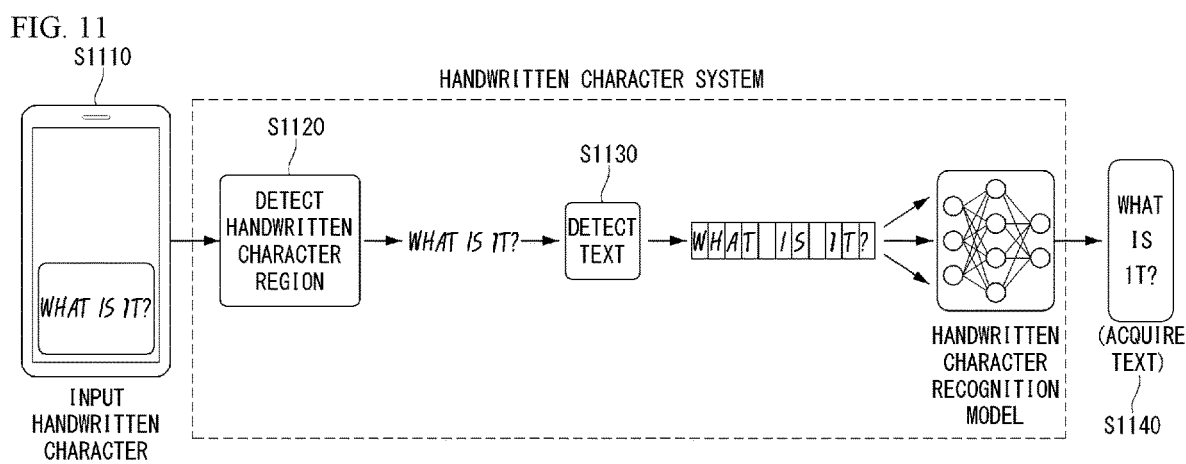
FIG. 11 is a diagram illustrating an example of a method for converting handwritten characters to which the present disclosure can be applied into a text.

FIG. 11 is a diagram illustrating an example of a method for converting handwritten characters to which the present disclosure can be applied into text. The user inputs handwritten characters through the terminal (S1110). The terminal separates a background and individual handwritten character regions from an image including the handwritten characters input by the user (S1120). In order to recognize which letters the cropped image contains, the handwritten character recognition model is used (S1130). This handwritten character recognition model can be implemented using a DNN in a deep learning method. Each terminal shares the same recognition model through a common prediction model received from the server. The DNN may obtain feature values of letters from the individual character regions, and may obtain individual letters using the feature values as an input value (S1140). A text conversion process by the general handwritten character recognition model is terminated here. When the inference error occurs in the handwritten character recognition model as shown in S1140, there is no way to improve the error.

S1020: Error correction and local data caching by user

Figure 12:
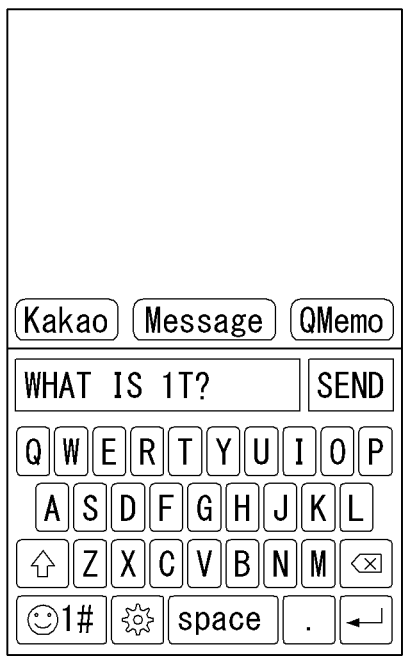
FIG. 12 is a diagram illustrating an example of error correction and local data caching to which the present disclosure can be applied.
Figure 12:
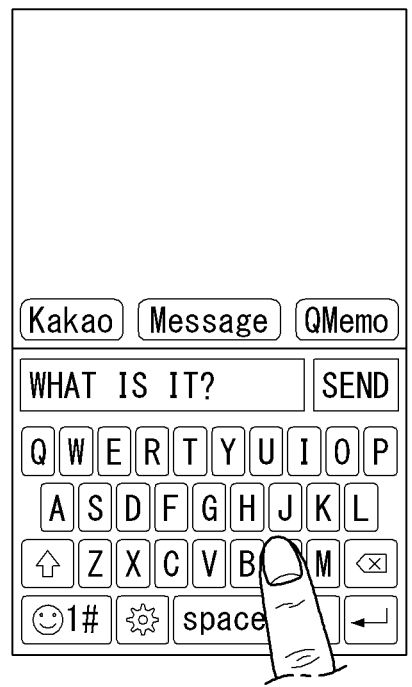
Figure 12:
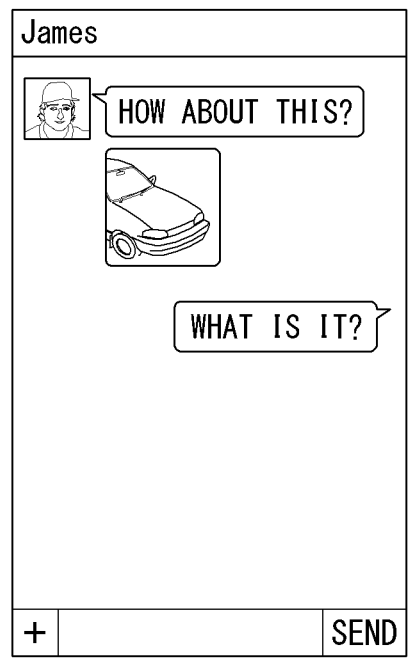

The present disclosure can naturally label the error data while the user confirms the results of the handwritten character inference, and can improve the common prediction model through the federated learning after the learning in each terminal. The improved common prediction model is downloaded to all terminals again, and the performance of the common prediction model can be improved continuously by repeating this process FIG. 12 is a diagram illustrating an example of error correction and local data caching to which the present disclosure can be applied.

After the handwritten characters are input, the user may recognize that an error has occurred through a conversion screen into text (S1210).

The user may delete a letter with an error and modify the letter to a correct letter (S1220). The correct letter data and the error letter data may be labeled together in the aforementioned handwritten characters area and may be stored in a local cache. Through this, not only the correct letters but also the error letters can be used to learn the handwritten character recognition model.

The user may transmit the error corrected letters (S1230). Through the feedback of the user, each terminal may acquire data for learning itself, and the data may have a variety according to the usage environment of each terminal.

S1030: Learning process in terminal

Figure 13:
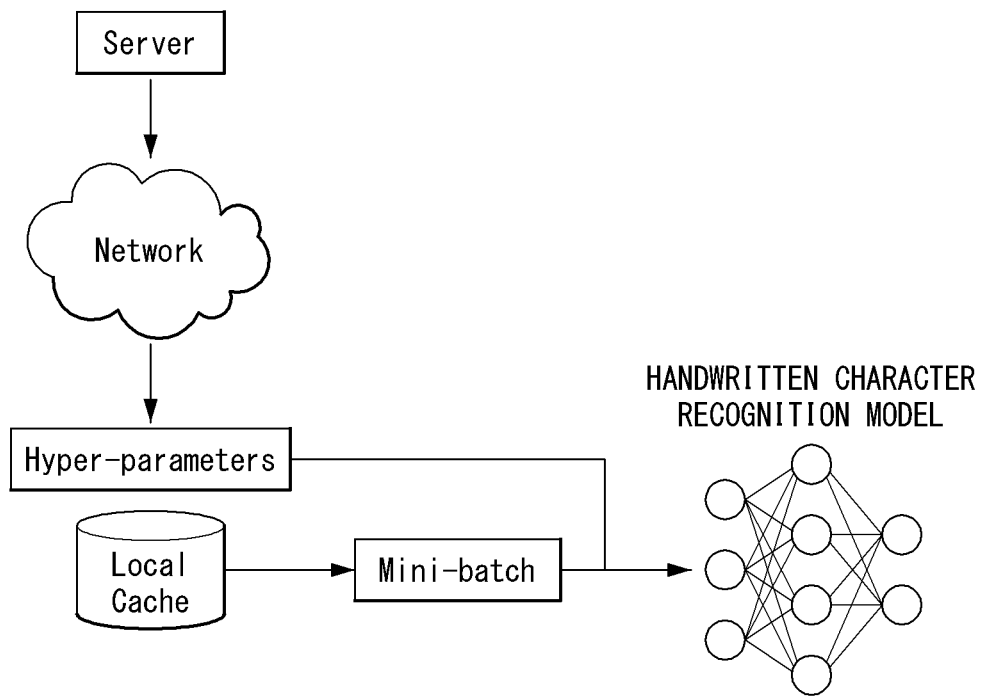
FIG. 13 is a diagram illustrating an example of a learning process in a terminal to which the present disclosure can be applied.

FIG. 13 is a diagram illustrating an example of a learning process in a terminal to which the present disclosure can be applied.

The terminal learns the handwritten character recognition model using the data cached under specific conditions. An example of the specific condition may include the state where the terminal is being charged, the state in which the terminal is connected to WiFi, and the case where the terminal is in an idle mode. Through this, the terminal may perform the learning process without affecting the operation of the main processor or using the mobile communication technology that is charged.

Hyper-parameters used to learn the handwritten character recognition model can be received from the server every round and used. The learning can be performed by updating weight parameters of the handwritten character recognition model of the terminal, and when the learning is completed, the weight parameters of the model are uploaded to the server and the data used for the learning in the cache of the terminal are deleted.

S1040: Improvement in common prediction model

Figure 14:
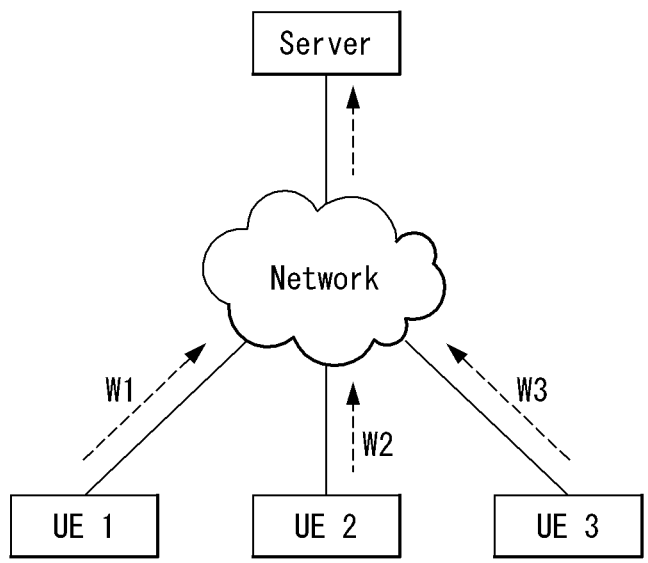
FIG. 14 is a diagram illustrating an example of a method for improving a common prediction model to which the present disclosure can be applied.

FIG. 14 is a diagram illustrating an example of a method for improving a common prediction model to which the present disclosure can be applied.

Each terminal transmits weight parameters to the server. The server may learn the common prediction model when the received weight parameters reach a predetermined number or more. The common prediction model can be learned using the average of the weight parameters received from each terminal.

S1050: Distribution of learned common prediction model

Figure 15:
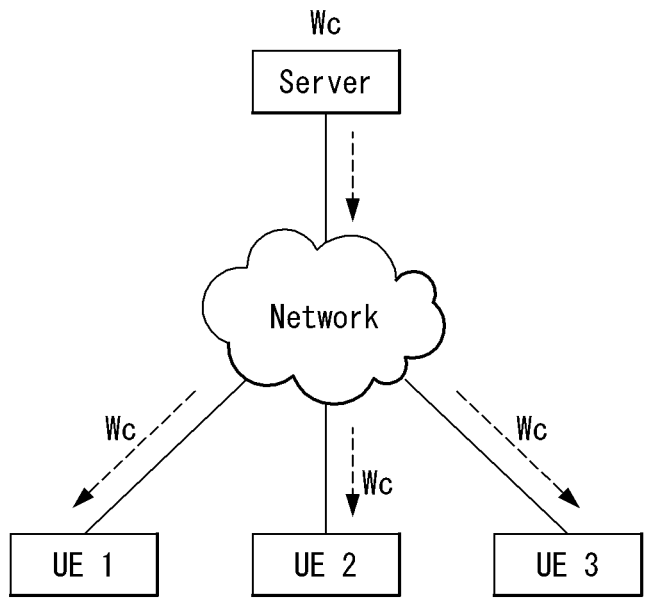
FIG. 15 is a diagram illustrating an example of the distribution of the common prediction model to which the present disclosure can be applied.

FIG. 15 is a diagram illustrating an example of the distribution of the common prediction model to which the present disclosure can be applied.

When the common prediction model is learned and updated, the server distributes the common prediction model to each terminal. This may be performed by a user's permission through an update notification message of the terminal, or the distribution may be automatically made when it is determined that the terminal corresponds to the specific condition presented in step 3. This may be achieved in a way that the server transmits weight parameters having an average value of the weight parameters used for learning to each terminal, and each terminal uses the weight parameters for learning.

General Apparatus to Which the Present Disclosure Can be Applied

Figure 16:
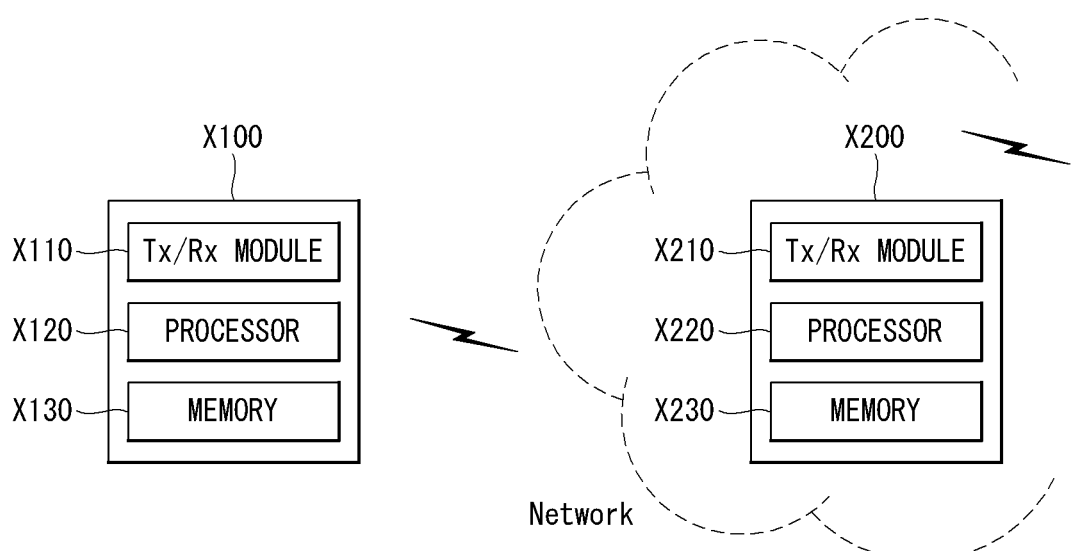
FIG. 16 is a diagram illustrating an example of a general device to which the present disclosure can be applied.

Referring to FIG. 16, a server X200 according to the proposed embodiment may include a communication module X210, a processor X220, and a memory X230. The communication module X210 may also be referred to as a radio frequency (RF) unit. The communication module X210 may be configured to transmit various signals, data and information to an external device and to receive various signals, data and information to an external device. The server X200 may be connected to the external device in a wired and/or wireless manner. The communication module X210 may be implemented by being separated into a transmitter and a receiver. The processor X220 may control the overall operation of the server X200, and may be configured to perform a function of computing information to be transmitted/received and the like to and from the external device. In addition, the processor X220 may be configured to perform the operation of the server proposed in the present disclosure. The processor X220 may control the communication module X110 to transmit data or a message to the UE, another vehicle, or another server according to the proposal of the present disclosure. The memory X230 may store the computed information and the like for a predetermined time and may be replaced with a component such as a buffer.

In addition, the specific configuration of the terminal device X100 and the server X200 as described above, may be implemented so that the matters described in various embodiments of the present disclosure can be applied independently or two or more embodiments are applied at the same time, and the duplicate content thereof will be omitted for clarity.

Examples to Which the Present Disclosure Can be Applied

EXAMPLE 1

A method for recognizing handwritten characters in a terminal through federated learning includes: receiving the handwritten characters from a user; extracting a feature value from an image including the handwritten characters; inputting the feature value to a first common prediction model and determining first text information from an output of the first common prediction model; caching the first text information and second text information received from the user for error correction of the first text information; and learning the first common prediction model using the image including the handwritten characters, the first text information, and the second text information, in which the first common prediction model is received through a server, and the first text information indicates text that may be mapped by the image.

EXAMPLE 2

In Example 1, in the learning of the first common prediction model, a weight parameter of the first common prediction model is updated using a hyper parameter received from the server.

EXAMPLE 3

In example 2, the method for recognizing handwritten characters further includes deleting the first text information and the second text information; transmitting the weight parameter to the server; and applying a second common prediction model received from the server, in which the second common prediction model learns the first common prediction model using the weight parameter received from one or more terminals in the server.

EXAMPLE 4

In Example 1, in the receiving of the handwritten characters from the user, the handwritten characters are received by a touch operation using a finger or a touch pen on an input region of the terminal.

EXAMPLE 5

In Example 1, the second text information may include correct answer text input by the user through an input region of the terminal based on the first text information recognized by the user through an output screen of the terminal.

EXAMPLE 6

In Example 3, in the applying of the second common prediction model, the first common prediction model is learned using the weight parameter extracted from the second common prediction model.

EXAMPLE 7

In Example 1, the method for recognizing handwritten characters further includes transmitting the second text information to another terminal.

EXAMPLE 8

In Example 1, the learning of the first common prediction model is performed when a condition set in the terminal is satisfied, and the condition includes a state where the terminal is being charged, a state in which the terminal is connected to WiFi, and a state where the terminal is in an idle mode.

EXAMPLE 9

In Example 3, the applying of the second common prediction model is performed when the condition set in the terminal is satisfied, and the condition includes a state in which a permission is input from the user as a response to an update notification message output to a screen of the terminal, a state where the terminal is being charged, a state where the terminal is connected to WiFi, or a state where the terminal is in an idle mode.

EXAMPLE 10

In Example 3, the second common prediction model learns the first common prediction model when a specific number or more of weight parameters set in the server are received.

EXAMPLE 11

A method for recognizing handwritten characters in a server through federated learning includes: transmitting, by a terminal, a first common prediction model for recognizing text from the handwritten characters received from a user; transmitting, by the terminal, a hyper-parameter for learning the first common prediction model; receiving a weight parameter from the terminal; and learning the first common prediction model using the weight parameter, in which the first common prediction model is transmitted to one or more terminals.

EXAMPLE 12

In Example 12, the method for recognizing handwritten characters further includes: transmitting a second common prediction model to the terminal, in which the second common prediction model learns the first common prediction model using the weight parameter.

EXAMPLE 13

In Example 11, the learning of the first common prediction model is performed when a set specific number or more of the weight parameters are received.

EXAMPLE 14

In Example 12, in the transmitting of the second common prediction model to the terminal, the weight parameter extracted from the second common prediction model is transmitted.

EXAMPLE 15

In Example 14, the transmitting of the second common prediction model to the terminal is performed when a condition set in the terminal is satisfied, and the condition includes a state where the terminal is being charged, a state in which the terminal is connected to WiFi, and a state where the terminal is in an idle mode.

EXAMPLE 16

A terminal performing a method for recognizing handwritten characters through federated learning includes: a communication module; a memory; a display unit; and a processor, in which the processor receives the handwritten characters from a user through the display unit, extracts a feature value from an image including the handwritten characters, inputs the feature value to a first common prediction model and determining first text information from an output of the first common prediction model, caches the first text information and second text information received from the user for error correction of the first text information through the memory, and learns the first common prediction model using the image including the handwritten characters, the first text information, and the second text information, and the first common prediction model is received through a server, and the first text information indicates text that may be mapped by the image.

EXAMPLE 17

In Example 16, the processor updates a weight parameter of the first common prediction model is updated using a hyper-parameter received from the server through the communication model in order to learn the first common prediction model.

EXAMPLE 18

In Example 17, the processor deletes the first text information and the second text information of the memory, transmits the weight parameter to the server through the communication module, and applies a second common prediction model received from the server, and the second common prediction model learns the first common prediction model using the weight parameter received from one or more terminals in the server.

EXAMPLE 19

In Example 16, the processor receives the handwritten characters through a touch operation using a finger or a touch pen on an input region to receive the handwritten characters from the user through the display unit.

EXAMPLE 20

In Example 16, the second text information includes correct answer text input by the user through an input region of the terminal based on the first text information recognized by the user through the display unit.

EXAMPLE 21

In Example 18, the processor learns the first common prediction model using the weight parameter extracted from the second common prediction model to apply the second common prediction model.

EXAMPLE 22

In Example 16, the processor transmits the second text information to another terminal.

EXAMPLE 23

In Example 16, the processor learns the first common prediction model when the condition set in the terminal is satisfied, and the condition includes a state where the terminal is being charged, a state in which the terminal is connected to WiFi, and a state where the terminal is in an idle mode.

EXAMPLE 24

In Example 18, the processor applies the second common prediction model when the condition set in the terminal is satisfied, and the condition includes a state in which a permission is input from the user as a response to an update notification message output to the display unit, a state where the terminal is being charged, a state where the terminal is connected to WiFi, or a state where the terminal is in an idle mode.

EXAMPLE 25

In Example 18, the second common prediction model learns the first common prediction model when a specific number or more of weight parameters set in the server are received.

The disclosure described above may be embodied as a computer-readable code in a medium in which program is recorded. A computer-readable medium includes all kinds of recorders where data that can be read by a computer system is stored. Examples of computer-readable media are hard disk drives (HDDs), solid state disks (SSDs), Silicon disk drives (SDDs), ROMs, RAMs, CD-ROMs, magnetic tape, floppy disks, optical data storage devices, and the like, and include implementation in the form of carrier waves (e.g., transmission over the Internet). Therefore, the detailed description above should not be interpreted in a limited way but should be considered as an example. The scope of the invention shall be determined by a reasonable interpretation of the claims attached, and all changes within the equivalent range of the invention are within the scope of the invention.

Further, in the above examples of service and implementation are described mainly, but these are only examples and do not limit the invention, and a person having an ordinary skill in the art to which the invention belongs are able to know a number of variations and applications not exemplified above are possible without departing from the essential characteristics of the service and implementation example. For example, each component specified in the implementation example can be modified to perform. And, these variants and their application-related differences should be interpreted as being within the scope of the invention as defined in the claims attached.

Although the present disclosure has been described with reference to an example applied to a UE based on a 5G (5 generation) system, the present disclosure may be applied to various wireless communication systems and autonomous driving devices.

According to the embodiment of the present disclosure, the terminal can provide the method for recognizing handwritten characters.

In addition, according to the embodiment of the present disclosure, each terminal can acquire the learning data through the feedback operation of the user and learn the models in each terminal using the acquired learning data.

Effects which can be achieved by the present disclosure are not limited to the above-mentioned effects. That is, other objects that are not mentioned may be obviously understood by those skilled in the art to which the present disclosure pertains from the following description.

What is claimed is:

1. A method for recognizing handwritten characters in a terminal through federated learning, the method comprising:
  extracting a feature value from an image including the handwritten characters;
  inputting the feature value to a first common prediction model and determining first text information from an output of the first common prediction model, wherein the first common prediction model is generated on two or more terminals associated with a server;
  caching the first text information and second text information received from a user for error correction of the first text information;
  learning the first common prediction model using the image including the handwritten characters, the first text information, and the second text information;
  deleting the first text information and the second text information;
  transmitting a weight parameter related with the first common prediction model to the server; and
  applying a second common prediction model received from the server,
  wherein the first common prediction model is received through the server, and the first text information indicates text that is mapped by the image,
  wherein the learning of the first common prediction model comprises updating the weight parameter using a hyper parameter received from the server,
  wherein the second common prediction model learns the first common prediction model using the weight parameter received from the two or more terminals in the server, and
  wherein the second text information includes a correct answer text input by the user through an input region of the terminal based on the first text information recognized by the user through an output screen of the terminal.

2. The method of claim 1, wherein the handwritten characters are received by a touch operation using a finger or a touch pen on the input region of the terminal.

3. The method of claim 1, wherein the second common prediction model is applied based at least in part on the first common prediction model being learned using the weight parameter extracted from the second common prediction model.

4. The method of claim 1, further comprising:
  transmitting the second text information to another terminal.

5. The method of claim 1, wherein the learning of the first common prediction model is performed when a condition set in the terminal is satisfied, and the condition includes a state where the terminal is being charged, a state in which the terminal is connected to WiFi, and a state where the terminal is in an idle mode.

6. The method of claim 1, wherein the second common prediction model is applied based at least in part on the condition set in the terminal being satisfied, and the condition includes a state in which a permission is input from the user as a response to an update notification message output to a screen of the terminal, a state where the terminal is being charged, a state where the terminal is connected to WiFi, or a state where the terminal is in an idle mode.

7. The method of claim 1, wherein the second common prediction model learns the first common prediction model when a specific number or more of weight parameters set in the server are received.

8. A terminal performing a method for recognizing handwritten characters through federated learning, comprising:
  a transceiver;
  a memory;
  a display; and
  a processor,
  wherein the processor is configured to:
  extract a feature value from an image including the handwritten characters,
  input the feature value to a first common prediction model and determine first text information from an output of the first common prediction model, wherein the first text information indicates text that is mapped by the image, wherein the first common prediction model is received through a server, cache the first text information and second text information received from the user for error correction of the first text information through the memory, learn the first common prediction model using the image including the handwritten characters, the first text information, and the second text information, delete the first text information and the second text information, transmit a weight parameter related with the first common prediction model to the server through the transceiver, and apply a second common prediction model received from the server, wherein the second common prediction model learns the first common prediction model using the weight parameter received from one or more terminals in the server, wherein the processor is further configured to update the weight parameter using a hyper-parameter received from the server through the communication model in order to learn the first common prediction model, wherein the second common prediction model learns the first common prediction model using the weight parameter received from two or more terminals in the server, and wherein the second text information includes a correct answer text input by the user through an input region of the terminal based on the first text information recognized by the user through the display.

9. The terminal of claim 8, wherein the handwritten characters are received through a touch operation using a finger or a touch pen on an input region.

10. The method of claim 8, wherein the processor is further configured to apply a second common prediction model, where the first common prediction model is learned using the weight parameter extracted from the second common prediction model.

11. The method of claim 8, wherein the processor is further configured to transmit the second text information to another terminal.

12. The method of claim 8, wherein the learning of the first common prediction model is performed when a condition set in the terminal is satisfied, and the condition includes a state where the terminal is being charged, a state in which the terminal is connected to WiFi, and a state where the terminal is in an idle mode.

* * * * *